(12) United States Patent
Essling

(10) Patent No.: US 12,386,022 B2
(45) Date of Patent: Aug. 12, 2025

(54) MEASURING ASSEMBLY AND METHOD

(71) Applicant: ANDROTEC GMBH, Waldfischbach-Burgalben (DE)

(72) Inventor: Mirko Essling, Kaiserslautern (DE)

(73) Assignee: ANDROTEC GMBH, Waldfischbach-Burgalben (DE)

( * ) Notice: Subject to any disclaimer, the term of this patent is extended or adjusted under 35 U.S.C. 154(b) by 480 days.

(21) Appl. No.: 17/594,236

(22) PCT Filed: Apr. 7, 2020

(86) PCT No.: PCT/EP2020/025165
§ 371 (c)(1),
(2) Date: Oct. 7, 2021

(87) PCT Pub. No.: WO2020/207629
PCT Pub. Date: Oct. 15, 2020

(65) Prior Publication Data
US 2022/0146621 A1 May 12, 2022

(30) Foreign Application Priority Data
Apr. 7, 2019 (DE) ...................... 10 2019 002 516.4

(51) Int. Cl.
*G01S 5/16* (2006.01)
*G01S 1/70* (2006.01)

(52) U.S. Cl.
CPC .............. *G01S 5/16* (2013.01); *G01S 1/7038* (2019.08)

(58) Field of Classification Search
None
See application file for complete search history.

(56) References Cited

U.S. PATENT DOCUMENTS

| | | | |
|---|---|---|---|
| 4,277,170 A | 7/1981 | Miles | |
| 4,379,624 A * | 4/1983 | Miller | F41G 7/2293 359/226.1 |
| 4,441,809 A | 4/1984 | Dudley et al. | |
| 5,110,202 A | 5/1992 | Dornbusch et al. | |

(Continued)

FOREIGN PATENT DOCUMENTS

| | | | |
|---|---|---|---|
| EP | 1367362 A1 | 12/2003 | |
| EP | 2237064 A1 * | 10/2010 | ............. G01S 17/42 |

(Continued)

OTHER PUBLICATIONS

International Search Report for PCT/EP2020/025165 Issued Sep. 7, 2020.

*Primary Examiner* — Rufus L Phillips
(74) *Attorney, Agent, or Firm* — NORTON ROSE FULBRIGHT US LLP

(57) ABSTRACT

A base station for measurements emits measurement radiation into a beam plane with a wobbling motion of the beam plane, such that a position of a normal of the beam plane is changed in a predefined manner such that orientations of the normal occur repeatedly, for example with a cyclic repetition of the beam plane. A measuring assembly for such a base station can be provided with at least one associated remote terminal. A method for guiding a mobile object, in particular a vehicle, uses a base station and at least one active remote terminal permanently associated therewith, which form a transceiver measuring assembly.

26 Claims, 8 Drawing Sheets

(56) References Cited

U.S. PATENT DOCUMENTS

| | | | |
|---|---|---|---|
| 5,764,828 A * | 6/1998 | Iga | G01C 15/004 |
| | | | 385/39 |
| 5,767,960 A | 6/1998 | Orman | |
| 6,133,998 A | 10/2000 | Monz et al. | |
| 6,756,581 B2 | 6/2004 | Ohtomo et al. | |
| 7,394,527 B2 | 7/2008 | Essling et al. | |
| 8,047,149 B1 | 11/2011 | Antonelli et al. | |
| 9,273,960 B2 | 3/2016 | Kumagai et al. | |
| 2009/0119050 A1* | 5/2009 | Hayashi | G01C 11/06 |
| | | | 702/94 |
| 2015/0037045 A1 | 2/2015 | Dumoulin et al. | |
| 2018/0259332 A1 | 9/2018 | Essling | |
| 2019/0353749 A1* | 11/2019 | Lam | G01S 5/16 |

FOREIGN PATENT DOCUMENTS

| | | |
|---|---|---|
| EP | 2998699 A1 | 3/2016 |
| EP | 1434029 B1 | 2/2018 |
| JP | H0915526 A | 1/1997 |
| WO | WO-9203701 A1 * | 3/1992 |
| WO | 2006/070009 A3 | 9/2006 |

\* cited by examiner

MEASURING ASSEMBLY AND METHOD

CROSS-REFERENCE TO RELATED APPLICATIONS

The present application is the national stage of International Pat. App. No. PCT/EP2020/025165 filed Apr. 7, 2020, and claims priority under 35 U.S.C. § 119 to DE 10 2019 002 516.4, filed in the Federal Republic of Germany on Apr. 7, 2019, the content of each of which are incorporated herein by reference in their entireties.

FIELD OF THE INVENTION

The present invention relates to measurements obtained with emission of measurement radiation into a beam plane that wobbles with predefined orientations of a normal to the beam plane.

BACKGROUND

Measuring assemblies that can be used to measure the position and/or the location of an object and/or individual coordinates relative to a base station find application in many fields, such as the detection of real objects for creating virtual realities, in industrial measurement, construction surveying, construction machinery control, etc., which is why a multiplicity of assemblies for measurement or surveying are known.

A multiplicity of different techniques have therefore been developed, such as tachymeters, laser trackers, rotary lasers, real-time kinematic GNSS receivers, etc., which in part do allow the simultaneous use of a multiplicity of measuring stations by way of relatively cost-effective assemblies, for example counterpart stations with respect to a base station, but entail a number of problems, such as excessively low measurement accuracy, multipath reception and shading e.g., in street canyons, and availability problems for correction services and satellite systems.

In a multiplicity of applications, therefore, a tried and tested approach involves installing a central base station that emits rotating beams or beam fans; by means of suitable beam receivers, the position of the receivers relative to the base station can be deduced. In principle, it would be possible, by means of a passive retroreflector, for example, to send the beam back from the receiver to the base, and there to determine from where the beam was reflected back. However, what are simpler to use and are widely adopted nowadays in measurements are so-called active receivers, in which, by means of light-sensitive elements, in response to the reception of light, an electrical signal can be generated and evaluated. In this case, the signature upon detection of the beam at the beam receivers depends firstly on the way in which the base station emits the beams, and secondly on how the beam receivers are configured. In this regard, beam receivers can be equipped with elongated or punctiform light-sensitive elements and the base station can emit light as beam fans or as a single beam and with constant intensity or with temporal modulation. It should be mentioned that the beams can be visible or invisible and beams in the radio-frequency range can optionally be used as well. For reasons of simplification, in the present text, reference will regularly be made in this respect, unless a different context is evident, nevertheless to the fact that the position determination is effected "optically" or at least "quasi-optically," even if optionally invisible radiation or radio-frequency radiation is used.

In the case of the described systems with a central base station, there are already a number of approaches for reducing costs and increasing the accuracy and the availability. This will be shown by way of example on the basis of the base stations known from the prior art which are illustrated in FIG. 1a to FIG. 1d.

FIG. 1a is concerned with the base station disclosed in U.S. Pat. No. 7,394,527 in the name of the present applicant and in U.S. Pat. No. 5,767,960, comprising three beam fans that are emitted from a rotating base and allow an active counterpart station synchronized by means of radio or a cable connection, i.e., an irradiated active target, to calculate, from the temporal sequence of the impingement of the three beam fans on the active target, the distance, the height and a horizontal angle of the active target in cylindrical coordinates relative to the base station.

FIG. 1b shows a base station from EP 1 434 029 comprising three beam planes that are emitted from the center of rotation, which, with a suitable active target, allows the calculation of a horizontal angle and a vertical angle in the polar coordinate system of the base station.

FIG. 1c shows an assembly from the prior art in accordance with U.S. Pat. No. 4,441,809, the properties of which largely correspond to those from FIG. 1a, although at least two active targets are needed for determining more than one elevation angle.

FIG. 1d in turn shows a base station from U.S. Pat. No. 5,110,202 comprising two rotating beam fans, whereby the active target can calculate a horizontal angle and a vertical angle in the polar coordinate system of the base station.

What the approaches from the prior art as illustrated in FIGS. 1a-1d have in common is that they are based on rotating laser optical units that emit at least two to three beam fans in order to be able to determine up to two direction angles in relation to an active target. Time measurements of the impingement times of the individual beam fans are used for this purpose. In this case, these approaches also make it possible, at least in principle, with the aid of the measured vertical and horizontal angles, to span almost any desired number of virtual (laser) planes in a measurement space around the base station, i.e., to measure them at a multiplicity of heights.

However, the previously known assemblies and the required receivers are often undesirably complicated from a structural standpoint, primarily if a high accuracy is intended to be achieved. Specifically, the precision of such optical assemblies is determined, inter alia, by the accuracy with which light is emitted by the base. In this case, one influencing factor, inter alia, but not the only factor, is the accuracy with which the mechanical set-up is implemented. This results in high costs for highly accurate base stations. As far as the range is concerned, it should be taken into consideration that the beams are often intended to be readily visible in order that the receiver can be brought into the beam path more easily, and that the beams are often emitted at a height that is close to eye level. For safety reasons, the beam energy should thus be restricted so as to bring about eye safety. This in turn reduces the range.

Moreover, the approaches presented are based inter alia on the fact that two or more beam fans have to be guided by respectively different (cylindrical) optical units, which, however, in general have imaging aberrations which are different and do not cancel one another out, as a result of which in particular a highly precise determination of vertical angles is not possible owing to the very critical required flatness or the synchronism of the beam fans without a complex, costly and time-consuming factory calibration in a plurality of degrees of freedom. Moreover, the synchronization between active receiver and base station is often only inexact or totally absent, which in turn imposes considerable requirements on the synchronism of the rotating laser heads if high angle accuracies are desired. Synchronism values of approximately 0.001% . . . 0.0001% are typically required in order to achieve angle accuracies of a few angular seconds for vertical and horizontal angles. These requirements mean that for the base stations it is necessary to resort to expensive and susceptible smooth-running bearing arrangements and to large centrifugal masses, which reduces robustness and casts doubt on practical suitability for many applications, especially since the base stations are becoming larger and heavier, which causes both the system price and the total user costs over the lifetime to shoot up.

It would therefore be desirable to enable improvements here, especially since at least the approaches known from the prior art from FIG. 1b and FIG. 1d still enjoy high popularity among users in the field of construction machinery control and industrial measurement.

Therefore, automatically tracking distance measuring devices in which a single counterpart station is tracked by the base station have already been developed for specific applications. Said single counterpart station can be a passive retroreflector or an active receiver or, if the base station is explicitly configured for receiving radiation from the counterpart station, can constitute an active transmitter. Such systems, often known as laser trackers for industrial measurement or as robotic tachymeters for land surveying, are still very popular, but have the disadvantage of not only being expensive but also allowing only a single target to be tracked per base.

In specific applications, e.g., in the construction machinery control of preferably entire, possibly even autonomous, road paving convoys, i.e., sequences of road pavers and a plurality of rollers, this results in almost prohibitive costs because a dedicated base station has to be kept available for each object to be tracked or to be measured or each measurement point situated thereon.

In the field of construction machinery control, it is often necessary, moreover, not only to measure a position or a location but also to monitor a height precisely. This is necessary for example, but not exclusively, in road construction, where for instance the installation height of the road pavement or the layer thickness of the road pavement has to be monitored. Many of the systems used for this comprising rotary lasers and so-called machine receivers, that is to say linear receivers on road construction machines, said receivers matching the rotary lasers, do allow precise height monitoring, but are tied to a single laser plane, which can constitute a considerable disadvantage in particular in uneven terrain.

Therefore, in uneven terrain, guide wires or guide strings have conventionally often been used, but laying them likewise requires a high outlay; even the approach of replacing a real guide string that is otherwise used with a virtual guide string, in particular using base stations with integrated receivers, typically still requires a high outlay in terms of instrumentation.

In this regard, EP 2 998 699 A1, for instance, proposes a method for installation height control and layer thickness monitoring of road construction machines. The disclosure content of said document is incorporated by reference. The method known from the prior art will be briefly elucidated with reference to FIG. 13.

The previously known method involves the use of stations that can be used simultaneously as base station and as receiver for the radiation of other stations, that is to say constitute rotary laser transceivers. These are used in the previously known method so that the guide wire that is otherwise customarily used for controlling the installation height of road pavers is replaced with a concatenated assembly of a plurality of rotary laser transceivers 66a . . . 66g (TRX) that are leveled with respect to one another, by a virtual guide wire being defined segment by segment along the road 67 with reference to the laser planes 72 generated by the base stations. The rotary laser transceivers serve as support points for said guide wire. By means of interpolation between the support points and optional smoothing thereof, the intention is to increase the distance between them and to reduce somewhat the calibration outlay for a given section.

Such a system is said to be less expensive than the costs for the calibration of a section a few kilometers in length by means of a conventional guide wire on the part of a surveyor, which is why the system price is said purportedly to be quickly amortized.

SUMMARY OF THE INVENTION

However, with such a system, many rotary laser transceivers that are leveled with respect to one another are required, even with interpolation, said transceivers furthermore being particularly complex from a structural standpoint in any case.

Moreover, the previously known system also has further disadvantages. In this regard, although limitations in the height measurement range are considerably reduced by the concatenated assembly described, they are not actually completely eliminated. This is illustrated in FIG. 12, which shows a typical configuration for hot asphalt installation using two machines.

It is evident that the reception of a laser plane in uneven terrain requires very long and thus generally particularly costly linear arrays of laser receivers on a road construction machine; in this regard, reference should moreover be made in particular to US 2018/0 259 332 A1 in the name of the present applicant, which is likewise incorporated by reference here in its entirety. However, in the event of vibrations of the machines, for example during use on the screed board of a road paver or on the suspension of the rolling member of a road roller, the length of these assemblies can result in measurement inaccuracies, which necessitates a compromise between flexibility, costs and availability for use.

A further disadvantage of the previously known prior art is that each transceiver 66 can only emit one laser plane, and that radiation only radiates into a single plane, for which reason a dedicated transceiver that simultaneously contains both a base station and an active target has to be provided for each support point of the virtual guide line in the prior art. These devices are thus restricted to a specific purpose of use and hardly suitable for universal applications.

It would be advantageous to be able to provide an inexpensive measuring system in particular having high accuracy at the same time.

It would also be advantageous to be able to provide virtual guide wires ("string lines") inexpensively. It would furthermore be advantageous to be able to use base stations which are usable for broader purposes of use. It would furthermore be advantageous to be subjected to restrictions in the height measurement range that are reduced compared with those known in the prior art.

A measuring assembly and a method would also be advantageous, inter alia, which allow support points of a virtual string line to be made possible without particularly expensive base stations being required, in order thus to further reduce the system costs.

It would also be desirable to specify an improved measuring assembly and/or a method for optical or quasi-optical position determination.

It would be desirable at least partially to achieve at least one of the advantages outlined above.

The object of the present invention is to provide something novel for industrial application.

This object is achieved by what is claimed in independent form.

Some of the advantageous embodiments are specified in the dependent claims; further advantageous embodiments and further intrinsically inventive solutions can be gathered from the description.

In accordance with a first basic concept of the invention, therefore, what is specified is a base station for measurements which involve emitting measurement beams into a plane, wherein the base station is configured for a wobble movement of the beam plane in such a way that the location of the normal to the beam plane is changed in a known way and such that orientations of the normal occur repeatedly.

Accordingly, a first basic insight is that a wobble movement of the beam plane that is deliberately provided in a known way and is effected in a controlled manner makes it possible to determine a vertical angle or, with the aid of further information, a height in a particularly simple way. By way of example, where the base station emits beams that are detected by a receiver, the height of the receiver relative to a height of the base station can easily be established.

To understand this, imagine that the beam plane is fixed, that is to say does not alter its alignment. A receiver that is currently lying in the beam plane, that is to say is currently being irradiated by a beam expanded with respect to the plane, will then also continue permanently to lie in the beam plane.

By contrast, if the beam plane wobbles, this has the effect that at the location of the receiver the beam gradually changes its height according to the wobble movement; more precisely, at a given point at a distance from the base station, the beam will move up and down between a largest height and a smallest height specifically according to the wobble movement. If a cyclic wobble movement is assumed for the sake of simplicity, and if it is further assumed that at a given point at a distance from the base station, the beam receiver is arranged in stationary fashion at a height between the largest height and the smallest height reached by the beam plane, then the beam plane will sweep over the receiver twice during a wobble cycle, specifically once while the beam plane reaches the receiver height by way of falling from top to bottom and then again when the beam plane reaches the receiver height by way of rising from bottom to top. If the receiver height is very close to the largest height, it will take only a short time until the beam plane falling again reaches the receiver again for the second time after the first sweeping over observed during rising. The same holds true if the receiver height is very close to the smallest height and the falling beam plane has just swept over the receiver height for the first time; in that case, too, the time until the beam plane firstly falling to its minimum height has risen up to the receiver again will only be short. By contrast, if the receiver height lies almost centrally between the smallest height and the largest height that can be reached by the beam plane at a given distance, for the same wobble velocity it will take a correspondingly longer time until the receiver is swept over again. Given known wobble behavior and a known distance from the base station, the height of the receiver can therefore be deduced from the temporal spacings of the sweeping over.

It should be pointed out that—if, given a periodic wobble movement, a receiver at a given height is swept over repeatedly—two different intervals between two instances of sweeping over can occur. The first interval corresponds to the time between the sweeping over during movement of the beam plane from top to bottom and the sweeping over during movement from bottom to top, while the second interval corresponds to the time between the sweeping over during movement from bottom to top and the sweeping over during movement from top to bottom. The two intervals together will correspond to the wobble period. However, one and the same interval combination can be observed both near the maximum and near the minimum of the height. If it is not clear whether the beam plane is inclined precisely upward or downward as a result of the wobble movement, this can result in an ambiguity, but that can be resolved in various ways.

It will additionally be clear that the maximum height that can be reached by the beam for a given, wobble-dictated inclination of the beam plane is dependent on the distance to the base station. In this case, the time intervals depend on how near the height of the receiver is to the minimum or maximum height that can be reached by the beam for a given, wobble-dictated inclination of the beam plane at said distance.

If the distance between the receiver and the base station is not known, vertical angles can thus already be obtained as usable measurement values, for example.

However, it is possible and advantageous if additional measures are taken in order to determine the distance between the receiver and the base station and/or in order to resolve the ambiguity of the height determination. There are various possibilities for this.

Optionally, in order to attain unambiguity with regard to the height, the measurement space can be restricted, for example to a half-space, the partition plane of which runs through the coordinate center of the base station, such that measurement is effected e.g., only at the height above or only at the height below a horizontal. At the receiver it would also be possible to ascertain whether the wobble movement at the location of said receiver results precisely in rising or falling of the beam plane, for example through the use of two light-sensitive elements. It should be pointed out here that an unambiguity, once given, persists provided that the way in which the active counterpart station moves relative to the base is tracked. This is sufficient then permanently to ensure unambiguity. The tracking is advantageous particularly where, for instance on account of temporary shading of one or more light-sensitive elements of an active counterpart station, it must be expected that an ambiguity cannot always be resolved even with a multiplicity of light-sensitive elements.

It is preferred here if the light-sensitive elements with known spacing are arranged one above another only at such a distance that generally both light-sensitive elements are swept over. In such a case, firstly it is possible to recognize from the sequence of sweeping over whether the upper light-sensitive element was swept over first and then the lower light-sensitive element, or vice versa. It is thus possible to recognize from the time profile of the reception events whether the beam plane is currently rising or falling as a result of wobbling at the location of the receiver. In addition, the distance between the receiver and the base station can then be determined as well. It should be mentioned that the outlay in terms of instrumentation for operating two sufficiently large light-sensitive elements in a light receiver and for evaluating the time signatures of these receivers is decidedly low. Moreover, such receivers can be made so vibration-resistant that no uncontrollable oscillations cause a disturbance even in the event of severe vibration such as occurs in road construction machines.

In general, the base station will emit radiation and the counterpart station will be configured as a receiver that receives the radiation emitted by the base station. Said receiver will constitute an active counterpart station because photoelectric elements such as photodiodes, which generate electrical signals in response to the impingement of the radiation, are typically provided therein and because the electrical signals are in general processed further, that is to say signal-conditioned, for example, in the active counterpart station, digital signals are determined in response to the analog reception signals and further variables, such as angles or coordinates relative to a base station, for example, are calculated in response to the digital signals.

With the term "light beams," emitted by the base station, reference is made here in the present text not just to visible optical radiation. Mention shall also be made of customary laser diodes that emit in the visible or invisible range, in particular in the infrared, solid-state lasers, LEDs, and array assemblies thereof with individually or jointly controllable elements that are shared by an identical downstream optical unit, for example a collimator optical unit, and also, for a quasi-optical wavelength range, Gunn diodes and other RF emitters as suitable sources of such radiation subsumed under the term "light beams" in the present text.

The emitted radiation will pass through a plane and said plane will wobble according to the invention. It should be pointed out that although a kind of tumbling movement might possibly be observable in the case of known base stations with a rotating beam on account of inaccurate or worn rotary bearings and the like, this is not a wobble movement, in particular not a wobble movement which is known, that is to say for which parameters are present which reveal in particular a current location of the normal. Unlike in the present case, in those cases the location of the normal to the beam plane will not change in a known and controlled way, let alone such that orientations of a normal are gone through repeatedly in a known way.

It should additionally be pointed out that the wobble movement of the present invention will in general result in considerable changes in the beam plane inclination. In this regard, it is clear that given an on average horizontal beam plane, the wobble movement will result in inclinations relative to the horizontal of at least +−2.5°, preferably +−5°, more preferably at least +−10°, particularly preferably at least +−15°, in each case relative to a 360° full circle.

It should be emphasized that even a single beam plane emitted by the base station in wobbling fashion with radiation in the optical or quasi-optical wavelength spectrum, said radiation being emitted as a beam profiled in sheetlike fashion, as a beam area or a beam fan, will be sufficient for determining two direction angles with respect to the base station, namely a vertical angle λ (lambda) and a horizontal angle ψ (psi) when sweeping over an active counterpart station. In this regard, it should also be mentioned that in the case of stationary or almost stationary counterpart stations, by virtue of the fact that the normal can repeatedly occupy the same location, an averaging of values is possible, by means of which the accuracy can be increased.

There are various ways of being able to achieve the effect that the location of the beam plane normal changes in a known and controlled way. In this regard, a complete rotation or a movement to and fro (in scanning or oscillating fashion) between two end points can be provided; a scanning movement to and fro has the advantage that a specific region is swept over more frequently; by contrast, a complete rotation can in general be realized more simply from a structural standpoint.

Moreover, in general the situation will be such that, during two beam passes of a rotation or scanning movement, the beam path runs through the same optical components of the base station and, consequently, errors that are otherwise particularly relevant largely cancel one another out, in particular linearity errors with regard to the measurement of vertical angles. A rapid one-dimensional calibration of vertical angle offsets is thus sufficient for being able to detect vertical angles even with accuracies down to the sub-angular second range.

It should be emphasized, however, that it is not necessary to use an active receiver as active counterpart station, but that rather optionally the active counterpart station can also be active owing to the fact that it itself emits beams, the base then receiving radiation only from a wobbling plane, for example by virtue of a suitable receiving optical unit being disposed ahead of a light-sensitive element. Where the present text thus otherwise refers to an optoelectronic beam transmitting element, in the case of such a reversal between transmitter and receiver, provision can instead be made of an optoelectronic beam receiving element such as a photodiode, APD, SiPM, detector array, a CCD or the like, and vice versa, the otherwise customary beam direction being reversed as a result. The beam plane will then not describe the directional characteristic of emitted measurement radiation, but rather a directional characteristic of light beam reception. This possibility clearly exists not only for the base station, but also for the counterpart station, configured in general as a receiver. Although this will not be elaborated further at all points hereinafter, it can have advantages in this respect because radiation can be directed exactly or roughly at the base, which can reduce the endangerment of persons for a given beam intensity.

Moreover, provision can also be made for both an optoelectronic beam transmitting element and simultaneously an optoelectronic beam receiving element to be arranged at the focus of a collimation optical unit in the base station, e.g., using a polarizing beam splitter with a lambda/4 plate. It thus becomes possible that the base station can simultaneously emit and receive optical radiation, which enables direction measurements on highly reflective passive targets such as, for example, the corner/cube reflectors (cat's eyes) used in total stations and also pulse time-of-flight measurements for determining a complete set of 3D coordinates. The beam plane will wobble in such a case, too. This by itself is already considered to be inventive since it allows a plurality of base stations to be calibrated with respect to one another, for example, and it also allows 3D measurements to be carried out, in a manner comparable to robotic tachymeters. The advantage here over previously known base station transceivers resides in significantly simpler optomechanics requiring only a single precise rotational axis, compared with two rotational axes in conventional tachymeters. The usability of such assemblies for segment chains forming guide lines, which will also be described below, shall be explicitly disclosed as particularly advantageous and inexpensive and is in turn by itself considered to be inventive.

It should be mentioned that it is inherently likewise considered to be worthy of a patent to equip a base station for radiation reception in such a way that in each case only radiation from a specific direction is received, and to upgrade the active counterpart station for beam emission, in particular where wobbling planes are employed, the base station then having a wobbling reception characteristic.

As is evident from the above, provision can thus be made, in particular, of a measuring assembly for optical or quasi-optical position determination which comprises, for an object whose position or location is to be determined, at least one active target which is spatially fixedly related to said object, and at least one base station in whose region that is detectable by measurements the active target is situated and in which the base station generates a wobbling beam plane.

It should be explained, moreover, that the term plane or beam plane is used to refer to a wide variety of beam arrangements. In this regard, according to the invention, for example sheetlike beam profiles can be used, such as e.g., a plane area that is preferably undistorted to the greatest possible extent, that is to say apart from imaging aberrations and matching errors; according to the invention, however, for the conical mirrors yet to be described or the total internal reflection conical recesses of axicons yet to be described, it is also possible to use conical surfaces having a round, elliptical or slightly wavy basic profile and reference is likewise made to beam fans or multiple beam fans such as, for instance, coplanar multiple beam fans caused by shading, and also to beam areas of these aforementioned types that are distorted by imaging aberrations and matching errors. Despite this broad interpretation of the term, an ideal, flat plane is assumed particularly where formulae are specified, in order to facilitate understanding of the formulae specified. It should be mentioned in this regard, however, that sheetlike beam profiles, beam fans or beams rotating in a plane (with imaginary freedom from wobbling without additionally superimposed wobbling) are particularly preferred, specifically even if the preferred variants are distorted by imaging aberrations and/or matching errors.

A wobble movement is preferably realized and thus defined by the fact that the end point of a normal to the beam plane rotates about an axis that is non-parallel to said normal, specifically with an angle of inclination with respect to the non-parallel axis, said angle of inclination being known at any time and preferably being constant or largely constant, wherein the phase of the rotation of the beam plane normal about the non-parallel axis is also known at any time and wherein the beam plane impinges on the active counterpart station, i.e., in general an active target, at least twice per cyclic rotation of the normal, specifically at normal phase angles $\psi_1$ and $\psi_2$. (Note that these phase angles are also referred to as rotation angles or angular positions hereinafter.) The normal thus follows a kind of precessional motion, as is known from gyroscopes.

As a rule, the non-parallel axis will moreover generally be perpendicular, which results in a beam plane wobbling on average about a horizontal plane. Where the wobble movement is realized as a cyclic wobble movement as a result of the rotation of optical elements, i.e., rotating beam deflecting components for radiation emitted by the base, the perpendicular axis can constitute the rotational axis of the optical elements.

It should be mentioned that it is not absolutely necessary, however, for the non-parallel axis to be aligned exactly perpendicularly. In particular, it is possible to compensate with respect to an alignment of the non-parallel axis not exactly perpendicular, which obviates a particularly complex installation and furthermore helps to avoid errors where an installed base itself gradually inclines during a measurement—for instance on account of an excessively soft surface underneath. It should thus be emphasized in this respect that although the non-parallel axis is usually largely perpendicular, in terms of its alignment it is not necessarily limited to such an alignment.

It can be understood from the above that, in a measuring assembly according to the invention, the at least two phase angles or the at least two points in time at which the active counterpart station is swept over when the beam plane normal rotates about the non-parallel axis can be used to calculate at least one direction angle in relation to the polar coordinate system of the base station. It is preferred in this respect if the active counterpart station, i.e., an active target, is designed for calculating at least one vertical direction angle $\lambda$ (lambda) in relation to the polar coordinate system of the base station. It furthermore becomes clear that the active target can be designed for calculating at least one horizontal direction angle $\psi$ (psi) in relation to the polar coordinate system of the base station.

It can be understood from the above that it is readily possible for the beam plane normal to pass through its orientations repeatedly by virtue of the normal to the beam plane passing through its location cyclically. Therefore, in one preferred exemplary embodiment, it is also proposed that a base station is configured to generate the wobble movement of the beam plane such that the normal to the beam plane cyclically repeats its location. A particularly advantageous cyclic movement can be attained by precession-like rotation of the beam plane normal about a generally vertical axis.

In order in this case to realize a wobbling beam plane movement in a particularly simple way, the base station merely needs to contain a rotating beam deflecting component. Examples of this that shall be mentioned include a rotating, transmissive, refractive angular prism, a rotating mirror arranged in a manner tilted with respect to a vertical or rotational axis, an axicon that can be formed as a conically ground lens that images a point source onto a line along the optical lens axis, or transforms a laser beam into a ring, or conical optical units, and likewise reference is made to any other rotatable assembly of a plurality of optical components which is able to deflect a collimated beam in rotating fashion about its direction of propagation by an angle a. On account of the simple implementability with such elements, it is clearly preferred if the base station contains a rotating beam deflecting component.

In addition, what can be realized particularly well from a structural standpoint and is therefore preferred is if the base station is configured for use with an active receiver and generates a wobble movement in such a way that the normal to the beam plane rotates about a rotational axis with a rotation angle that is known at any time, said rotational axis being non-parallel to said normal and being at a predefined, at least largely constant, angle of inclination with respect to said normal, and the beam plane impinges on the active receiver at least twice per rotation of the normal.

As explained above, a number of beam profiles are possible. In order to obtain them from conventional beam sources such as laser diodes, solid-state lasers or LEDs, the use of beam conditioning components is preferred. It is therefore preferred if the base station comprises a beam expanding component or beam expanding means, e.g., a beam-to-beam plane expanding component. It is pointed out that the beam can optionally also be expanded to form one or more fans. It is furthermore pointed out that it is possible to influence the spatial distribution of the emission by means of shading, selective absorption and the like.

A beam expanding component for generating the beam plane can assume for example the shape or function of a conical mirror. The latter can be designed with any desired cone angle, but preferably 90°. The use of axicons shall likewise be disclosed, as an example a planoconcave axicon with internal reflection and lateral coupling out via a lateral surface, and cylindrical optical units shall also be mentioned as usable, as well as any other combination of suitable optical components.

Moreover, provision can furthermore be made for the base station to contain an optoelectronic beam transmitting element, downstream of which optical elements are disposed and/or which is provided integrally with optical elements in order to collimate the emitted radiation to a specific aperture angle, or preferably to as parallel a propagation as possible. What are conceivable for this are laser diodes, solid-state lasers, LEDs, and array assemblies thereof with individually controllable elements shared by the same collimator optical unit, and also, for the quasi-optical wavelength range, Gunn diodes or other RF emitters.

Provision can likewise be made for both an optoelectronic beam transmitting element and simultaneously an optoelectronic beam receiving element to be brought into the focus of the collimation optical unit e.g., by way of a polarizing beam splitter with a ¼ plate. It thus becomes possible that the base station can perform direction measurements on highly reflective passive targets such as, for example, the corner cube reflectors (cat's eyes) used in total stations, and pulse time-of-flight measurements for determining entire 3D coordinates. Base stations can thus e.g., be calibrated with respect to one another or perform 3D measurements, in a manner comparable to robotic tachymeters. The advantage here then resides, however, in the significantly simpler optomechanics requiring only a single precise rotational axis, compared with two rotational axes for the tachymeter.

It is furthermore preferred for the collimated beam to be deflected by a rotating beam deflecting component and to be expanded by the beam plane expanding component to form the wobbling beam plane.

As is evident from the above, in one preferred exemplary embodiment, the base station will comprise an optoelectronic element that emits light radiation and a collimator for the radiation of said element, wherein a rotating beam deflecting component is furthermore provided, which are configured such that they expand the light emitted by the optoelectronic element that emits light radiation to form a wobbling beam plane. It is clear that this enables a particularly simple structural embodiment of the base station.

The example of a beam plane normal rotating about a perpendicular axis was introduced above, where it was explained that the axis need not necessarily be exactly perpendicular. It has already been pointed out that compensation of a not exactly perpendicular position is possible. It is accordingly advantageous if an inclination compensator is provided in a base station according to the invention. It should be pointed out that either the inclination compensator can mechanically constrain a horizontal alignment, for example by means of actuator-based correction of an incorrect position, optionally also a repeated actuator-based correction of a changing incorrect position, but that preferably only the angle of inclination of a structurally defined axis of the base station, for example of a rotational axis of rotating optical components, has to be detected sufficiently accurately and the corresponding information is used for evaluation. It is thus possible to carry out compensation of a basic inclination of the beam plane without wobbling, i.e., the average orientation of the beam plane, in two different ways, namely firstly by means of a mechanical alignment and secondly by means of a metrological detection and computational compensation. It should be mentioned that the metrological detection and computational compensation is in general less expensive, specifically both structurally and during operation, and should therefore be preferred.

It is furthermore advantageous if the base station comprises a means for modulating the light radiation emitted by the optoelectronic element with a data signal, preferably with an angle-encoding data signal and/or with some other data signal encoding auxiliary data, preferably with a unique identifier (ID or serial number) of the base station and/or the temperature of the base station, the battery status of the base station, etc., and the position of an inclination sensor or inclination compensator. The information about a current actual inclination and thus the average orientation of the beam plane can thus preferably be modulated onto the radiation emitted by the base station. The current phase in the cycle of a beam plane normal rotation can likewise be communicated to the active counterpart station by means of the angle-encoding data signal. The particular advantage of transmitting the current phase in the cycle of a beam plane normal rotation, i.e., for example the current rotation angle of a rotating optical unit that brings about the beam plane wobbling as a result of its rotation, that is to say of a rotating angular prism, for instance, consists, in addition to the structural simplification as a result of the omission of additional elements such as for wired transmission or wireless transmission, primarily in the freedom from latency. It should be pointed out that averagings are possible in the case of multiple reception and that particularly suitable methods for encoding the rotation angle information are disclosed below. A measuring assembly is accordingly preferably configured such that a means for modulating the optoelectronic beam transmitting element with an angle-encoding data signal is provided.

It is thus possible for an angle-related synchronization between the base station and the active counterpart station not to be effected as previously—with a time offset and only inexactly—by way of separate radio or infrared data transmission susceptible to interference, but rather to achieve it directly, by modulation of the radiation of the beam plane with an angle-encoded data signal and optionally further auxiliary information from the base station. This measure alone has the effect that the requirements in respect of the synchronism of the rotation can already be reduced by typically more than two orders of magnitude, and costly bearing arrangements and centrifugal masses that are otherwise required can be dispensed with. The transmission of a rotation angle by modulating suitable information onto an emitted beam is moreover advantageous and is considered to be advantageous inherently by itself—that is to say in particular independently of a beam plane wobble movement—also where a base station emits a rotating beam or rotating beam planes or fans and a current rotation angle must be known during beam reception, in particular for the purpose of determining coordinates of a measurement beam receiver. In this case, a data signal modulated onto emitted radiation can encode e.g., the current angular position of the rotational axis of a beam deflecting component, the angular position in turn being obtained by an angle encoder coupled to the rotation of the beam deflecting component.

It should expressly be pointed out in this respect that herein claimed or disclosed partial aspects of the invention disclosed herein, such as, in particular, the optical data transmission by way of the laser beam for example with rotation angle data and/or the transmission of auxiliary information such as, for example, a unique identifier (ID or serial number), can also generally be applied advantageously to the laser transceivers from EP 2 998 699, and also to any arbitrary rotary laser, which are thus enabled to determine horizontal angles, without realizing external synchronization, e.g., by way of radio or by way of separate IR data transmission, or in order to be able to unambiguously assign received laser beams to a laser transmitter.

It is also evident from the above how advantageous it can be to transmit at least intermittently in addition to angle data even further auxiliary data about the radiation or the beam plane, such as, in particular, e.g., the alignment, i.e., positioning of an inclination sensor or inclination compensator for the subsequent compensation of the base station tilting at and by means of the active counterpart station; battery status, temperature or the like can likewise be transmitted, which, in the case of lengthy measurements, enables early identification where possible of critical base station operating states, without a person having to monitor them at the base station.

It should be mentioned that the size of a light-sensitive element in the active counterpart station will typically be of a magnitude such that the process of sweeping over the light-sensitive element and thus the reception of the radiation from the base station take up a certain time. Since this will be the case even for light-sensitive elements having quite a small area, this makes it possible, without particular structural outlay at the active counterpart station, to determine direction angles particularly accurately, provided that the active counterpart station is configured to determine the phase angle of the beam plane normal that is given during the time period of the sweeping over, i.e., the angular position of its rotation about the rotational axis, by way of taking into account and calculating a temporal centroid of the beam reception.

Specifically, the phase angle of the beam plane normal is typically encoded with discrete angular steps; in the case of relatively lengthy reception of radiation encoded with said discrete angular steps, it becomes possible to interpolate between a plurality of discrete angular steps.

Interpolation is thus preferably effected between a plurality of discrete angular steps which, during the beam reception, i.e., during the process of sweeping over the active counterpart station, were transmitted by the base station and received at the active counterpart station. Alternatively and/or additionally, a beam reception signature can also be evaluated by optimization of a model for the course of typical beam reception e.g., using an LMS method or a correspondingly trained neural network (AI).

In the case of large distances between base station and light-sensitive element, the beam reception events become severely noisy and/or have a very short duration, such that often only a single angular step can still be decoded at the receiving end. Even in that case, however, it is still possible, nevertheless with subsample accuracy, i.e., significantly more accurately than the encoded angular steps, to deduce the phase angle of the temporal centroid, specifically by taking account of the wobble velocity and the envelope of the received signal. It is clear that, in the case of corresponding calculations, the wobble velocity need not be known particularly accurately nor do its fluctuations over time under the conditions mentioned have an appreciable influence on the measurement accuracy.

As is evident from the above, protection is claimed firstly for a base station. However, protection is also claimed for a measuring assembly comprising at least one corresponding base station as described above and at least one associated active counterpart station. It should be mentioned that optionally the active counterpart station, as described, can be arranged in a further base station, without necessitating a particularly high structural outlay. In other cases and/or in addition, however, the active counterpart station can also be realized by an active receiver, wherein an active receiver is assumed if it contains active electronic elements or active electronic circuits or data evaluation units or the like. It should be mentioned that a measuring system of the present invention comprising a base station can address more than one active counterpart station and, accordingly, more than one active counterpart station can also belong to the measuring system. In particular, at least one active counterpart station provided on a mobile unit and an active counterpart station arranged in stationary fashion can be present, for instance, for the purpose of defining virtual guide lines.

As already explained, it is possible, moreover, to resolve ambiguities in the height determination in a simple way by means of suitable configuration of active counterpart stations. In particular, this is possible by using light-sensitive elements that are spaced apart in the vertical direction, wherein, if the distance between light-sensitive elements used therein is known, the distance between the active counterpart station such as an active light receiver as active target and the base station can be determined at the same time.

One preferred embodiment of a measurement beam receiver therefore provides that it comprises at least two light-sensitive elements which are spaced apart from one another and which are arranged at different heights during operation, and that it is configured, from the time signature of the process of sweeping over the light-sensitive elements, to resolve an ambiguity of the height determination and preferably also to determine the distance from the base station. It should be mentioned that in the same way, in the case of a counterpart station that emits radiation, at least two beam sources could be provided in a manner correspondingly spaced apart from one another.

It will be clear that active counterpart stations such as active measurement beam receivers will be particularly upgraded for use with the base stations of the present invention, particularly as far as preferred embodiments are concerned.

Protection is therefore also claimed for a measurement beam receiver which is configured for receiving light beams from a base station as disclosed in the present case or as described above and which can be configured in particular, in response to repeated detection of the wobbling beam plane, to calculate at least one angle in relation to the polar coordinate system of the base station or data related thereto, preferably by way of determining points in time of the detections and/or by way of determining at least two angular positions of the beam plane normal rotating as a result of the beam plane wobbling at the points in time of the detections. It should be mentioned that it is possible, in principle, using base stations according to the invention and associated active counterpart stations, to determine the complete position and optionally location of the active counterpart stations relative to the base station, and that clearly any desired coordinates are also determinable, without the need to refer to cylindrical or spherical coordinates that are particularly illustrative for explanation purposes with the base station as origin.

In the case of a measurement beam receiver according to the invention, it is preferred, as will be evident from the above, for said measurement beam receiver to be configured to determine the angular positions by way of decoding the radiation modulated with an angle-encoding data signal and optionally auxiliary data, and/or for said measurement beam receiver to be configured for calculating at least one vertical angle in relation to the polar coordinate system of the base station.

It is furthermore preferred if a measurement beam receiver is configured for calculating at least one horizontal angle in relation to the polar coordinate system of the base station. A signal conditioning and/or a digital data processing stage will thus typically be provided.

In order to determine direction angles highly accurately, an active counterpart station, i.e., an active target, can be configured to determine the angular position of the rotation of the normal to the beam plane about the rotational axis from the radiation of the beam plane modulated with the angle-encoded data signal or possibly auxiliary data at the point in time of impingement, and with a temporal centroid calculation of the beam reception for interpolation between the discrete angular steps transmitted.

One particularly advantageous and typical application of the measuring system, of the light-emitting base and/or of a measurement beam receiver according to the invention is that of guiding mobile objects, in particular vehicles, e.g., autonomously driving vehicles.

Protection is therefore also claimed for a method for guiding a mobile object, in particular a vehicle, in which a radiation-emitting base station and at least one measurement beam receiver for the radiation thereof that is fixedly related to the mobile object are used, wherein at least one further measurement beam receiver is set up in stationary fashion, a virtual connecting line between the base station and the further measurement beam receiver set up in stationary fashion is ascertained, and then guide data for the guidance of the mobile object are ascertained with reference to radiation detections by the measurement beam receiver that is fixedly related to the mobile object, and the virtual connecting line, preferably by determining a plane in which the connecting line between the base station and the stationary measurement beam receiver lies and which additionally has a defined transverse inclination, and with further preference a target guide line is determined in said plane and with further preference guide data are determined in order to guide the mobile object along said plane. The transverse inclination can be defined e.g., by means of an inclination value predefined by the user or by means of the connecting line from the base station to a further measurement beam receiver set up in stationary fashion.

What is thus proposed is, in particular, a method for determining height and location of a vehicle by means of a measuring assembly for optical or quasi-optical position determination comprising at least one active target that is fixedly related to the vehicle, and at least one base station, wherein the active target is arranged in the detection region of said at least one base station, and wherein at least one further, stationary, active target is provided, and wherein the connecting line between the base station and the stationary active target spans a segment of a virtual guide wire and a virtual laser plane with a predefined transverse inclination, at which the vehicle is guided in terms of its working height, in a manner comparable to a traditional guide wire, with the aid of the direction angles of the base station that are obtained by means of the active targets.

One advantageous possibility of such a method is that a chain of segments of a virtual connecting line is set up in such a way that base stations that emit radiation, preferably light radiation, and active counterpart stations, i.e., preferably measurement beam receivers, set up in stationary fashion alternate along the chain and said chain of segments forms the virtual guide wire. In this case, each base station can be assigned two virtual laser planes that are determined computationally from the direction angles of the station by the respectively adjacent stationary active counterpart stations or targets.

In this case, the active counterpart stations need not simultaneously serve as base stations, but rather can be purely beam-receiving active counterpart stations. This advantageous embodiment results in a considerable reduction of the structural outlay for establishing a virtual connecting line of given length for the same base station range, that is to say for the same beam power. The fact that the various support points can communicate along one another in such a system, just in order optionally to inform other stations about a station's own, possibly currently critical, operating state and/or in order to interrogate operating states of other stations, shall be disclosed as an advantageous variant.

It should be mentioned, moreover, that in an advantageous use of the described method for guiding a mobile object, it is particularly preferred for the guide data determinable for different segments to be smoothed and/or interpolated at least at the transition points of the segments, preferably in each case with reference to additional information, particularly preferably with reference to points of intersection of the direction angles with the planned course of a guidance path and/or to odometer values, wherein control parameters for the automatic movement of the mobile object are preferably determined as guide data.

It should be pointed out that the above-described method for guiding a mobile object can also be realized using base stations from the prior art, e.g., in accordance with FIGS. 1a-1d, which is inherently likewise considered to be inventive, just like the use with wobbling beam planes is also considered to be inventive.

Furthermore, the base stations—used in the method described above—according to the invention or known from the prior art analogously to EP 2 998 699 A1 can also be embodied as measurement beam transceivers, which is likewise considered to be inventive.

The invention is described below merely by way of example with reference to the drawings.

DETAILED DESCRIPTION

Figure 1A:
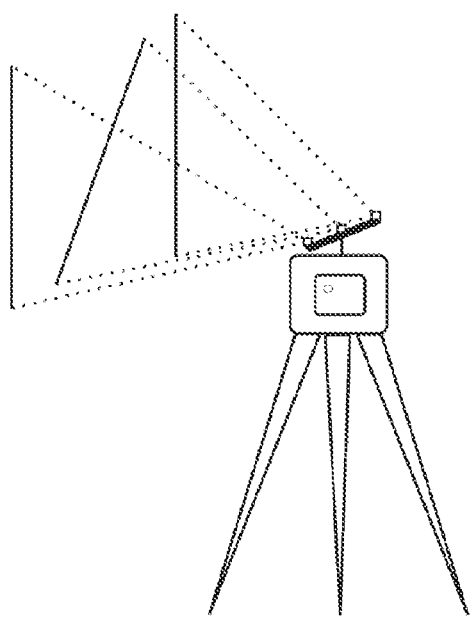
FIGS. 1a-1d show four different exemplary measuring assemblies from the prior art.
Figure 1B:
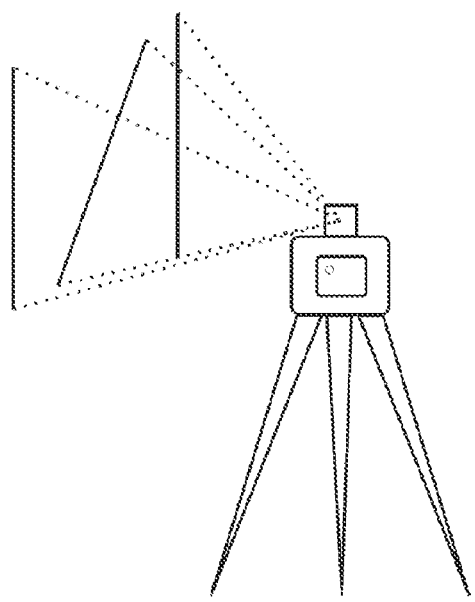
Figure 1C:
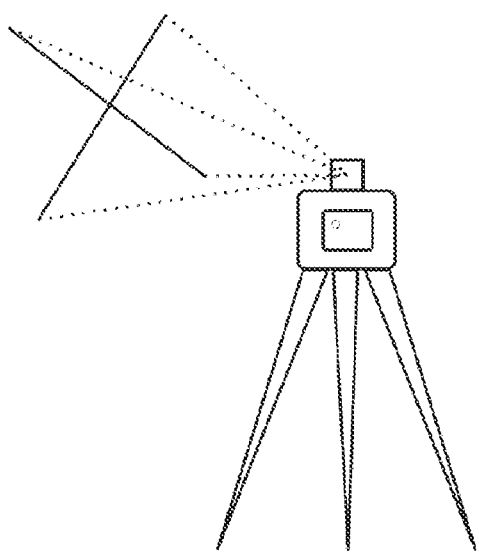
Figure 1D:
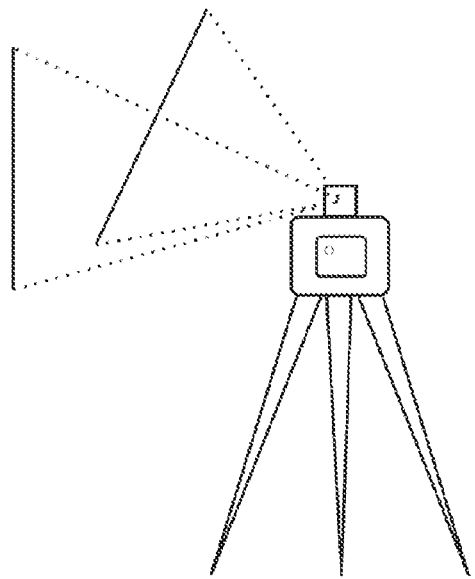
Figure 2:
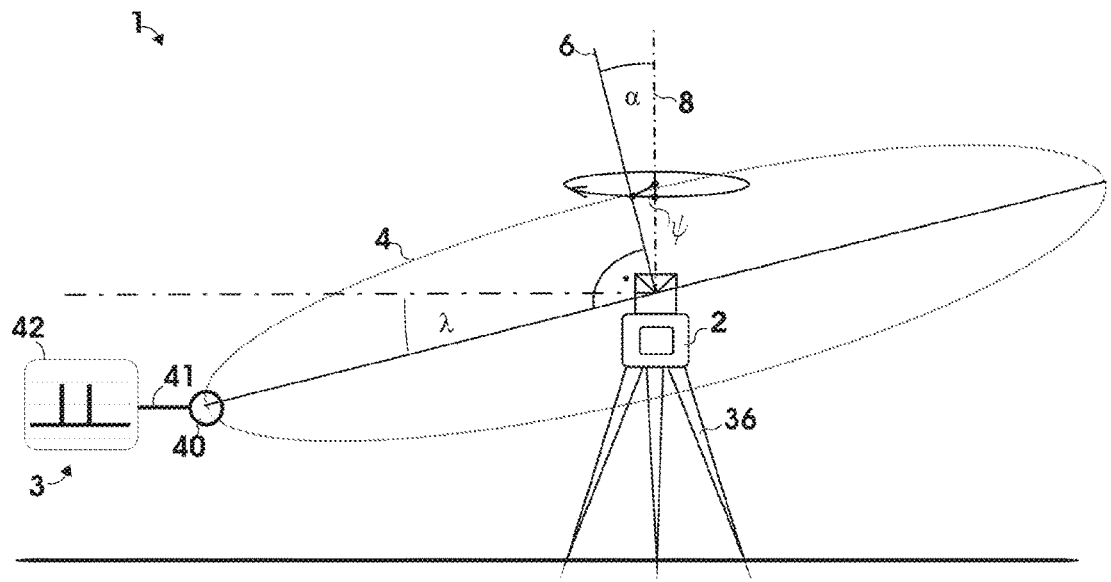
FIG. 2 shows an overview of a measuring assembly according to an example embodiment of the present invention.

FIG. 2 shows a measuring assembly designated generally by 1 and comprising a base station 2, which emits measurement radiation into a plane, wherein the base station 2 is configured for a wobble movement of the beam plane 4, by means of which wobble movement the location of the normal 6 to the beam plane 4 is changed in a known way such that a series of orientations of the beam plane normal 6 are gone through in a known way, cf. phase angle ψ (psi). Furthermore, the measuring assembly 1 comprises an active counterpart station 3 for receiving the measurement radiation emitted by the base station 2, i.e., an active target 3.

In the exemplary embodiment illustrated, the base station 2 is arranged on a sufficiently stable tripod stand 36 and emits visible light as measurement radiation. In the exemplary embodiment illustrated, the base station 2 is situated such that an axis 8 is aligned perpendicularly. As will also be explained with reference to FIGS. 7a-7f, beam deflecting optical elements rotate about the axis 8 in the base station 2. In this case, the wobble movement of the exemplary embodiment in FIG. 2 is effected such that the normal 6 to the beam plane 4 is inclined relative to the axis 8 by an angle α (alpha) and an end point of a normal unit vector 6 intersecting the axis 8 rotates on a circle about the axis 8. The phase angle ψ (psi) indicates what phase of the circular rotation said normal vector is in.

The active target 3 can for example be secured to an object to be measured (not shown) in a releasable or nonreleasable manner, be held on said object or be installed fixedly or movably in order to measure a position thereat. It will be understood that the wobbling beam plane sweeps over an active counterpart station 3 arranged at a suitable height twice during each wobble cycle. The active target 3 comprises a light-sensitive element in order to generate a characteristic signal in each case during the reception of the measurement radiation that is brought about as a result of sweeping over. From the signature of said characteristic signal, symbolized by the curve at the receiver 42 in FIG. 2, it is possible to deduce the orientations of the normal at those times at which the measurement radiation is received, as will also be described further below.

In order to generate a wobbling beam plane, an optoelectronic beam transmitting element 12 is arranged in the base station 2, cf. FIGS. 7a-7f, wherein optical elements that shape and deflect the beam of the optoelectronic beam transmitting element 12 are disposed downstream thereof. There are a multiplicity of optical assemblies that can be used to achieve the desired wobble movement of the beam plane 4. Some of said multiplicity of optical assemblies shall be described with reference to FIGS. 7a-7f.

Figure 7A:
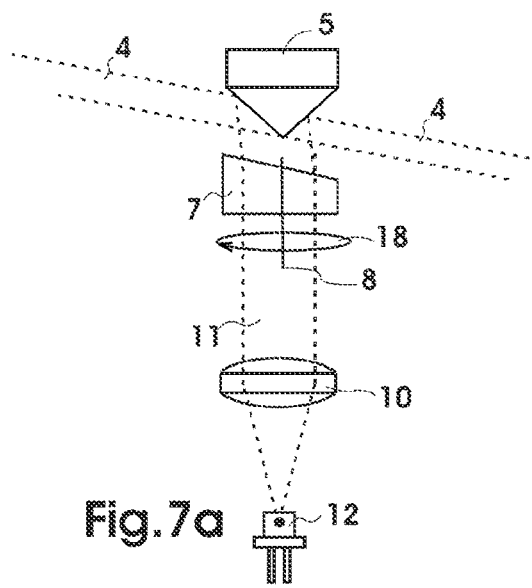
FIGS. 7a-7f show six alternative arrangements of optical components in the base station, according to example embodiments of the present invention.

FIG. 7a shows the arrangement of the optical components of a particularly preferred variant of the base station 2. In this case, the optoelectronic beam transmitting element 12 is a laser diode 12 that emits a divergent beam. The latter is converted into a largely parallel collimated beam by means of a collimator 10, which is configured as a biconvex lens of optimum shape in the exemplary embodiment illustrated. Said collimated beam subsequently impinges on a rotating beam deflecting component 7, which is a rotating angular prism in the exemplary embodiment illustrated in FIG. 7a. In this case, the angular prism rotates about the rotational axis 8, which is in turn parallel to the propagation of the collimated beam 11.

In the exemplary embodiment illustrated in FIG. 2, the rotational axis 8 is perpendicular and the wobbling beam plane 4 has a normal vector 6 that is inclined relative to the perpendicular rotational axis 8 by the deflection angle alpha. For driving the rotation of the angular prism, provision is made of an electric motor 18 that generates the rotational movement, said electric motor merely being illustrated schematically in FIG. 7a.

In the exemplary embodiment shown in FIG. 2, the collimated beam that is thus cyclically deflected into different directions according to an angular prism rotation which different directions however are always oblique relative to the perpendicular 8, is then incident on a 90° conical mirror 5, which converts the deflected collimated beam into a beam plane 4 and inclines it further in the process.

In this case, the inclination of the beam plane 4 downstream of the conical mirror 5 is such that the normal 6 to the beam plane 4 is oblique at the angle alpha with respect to the perpendicular rotational axis 8. As evident from FIG. 2, the normal 6 rotates cyclically about the perpendicular 8 according to the angular prism rotation, such that the beam plane normal 6 repeatedly assumes the same orientation while the angular prism rotates, and wherein the instantaneous orientation of the beam plane normal 6 is known at any time, provided that it is known how the angular prism is instantaneously oriented as a result of the angular prism rotation about the perpendicular rotational axis 8, said rotation being brought about by the rotary motor 18. One preferred possibility will also be indicated below as to how an instantaneous orientation of the angular prism can be determined by means of the angular prism rotation brought about by the rotary motor 18 and can be communicated to the active target 3.

Since the conical mirror 5 expands the deflected, collimated beam to form a beam plane, a beam expanding component is realized in this respect.

In the case of the exemplary embodiment illustrated, it should be noted that the beam plane has a finite thickness and this thickness is moreover different in different directions. This is discernible from FIGS. 7a and 7b. This effect of varying thicknesses can best be understood if it is assumed that the vertex of the conical mirror 5 lies exactly over the perpendicular axis 8 and, moreover, the axis of symmetry of the conical mirror extending through the vertex of the conical mirror 5 lies exactly on the perpendicular axis 8. It should furthermore be assumed that the collimator collimates the radiation from the optoelectronic beam transmitting element 12 to form a precisely circular and homogeneous beam of parallel individual rays. (It should explicitly be pointed out that these assumptions of an exact alignment are made only in order to be able to better explain the effect of the different thicknesses, but that the realization of the assumptions is not absolutely necessary for the practical implementation and the invention or the particular exemplary embodiment is in no way intended to be restricted to the assumed exactness. It should therefore be explicitly pointed out to the readers that neither an exact arrangement of the conical mirror vertex on the perpendicular axis, nor the exact coaxial alignment of the axis of symmetry of the conical mirror extending through the vertex of the conical mirror 5 with the perpendicular axis, nor an exactly circular beam collimated exactly without divergence as described are required in practice, rather respective inaccuracies and deviations may be readily accepted or, where a higher precision is desired, corrections of inaccuracies are possible. The fact that high structural precisions in the direction toward the simplifying assumptions made for the sake of better explanation can nevertheless be achieved without great outlay should be mentioned, however.)

Under the simplifying assumptions made in respect of the conical mirror alignment, it can be understood particularly well why the beam thickness varies in different directions, by considering for two directions in each case central rays, or rays lying at the outer edge of the collimated beam, namely those in the direction with the greatest rising beam plane inclination away from the conical mirror 5 or the corresponding rays in the direction diametrically opposite thereto with the greatest falling beam plane inclination.

Figure 7B:
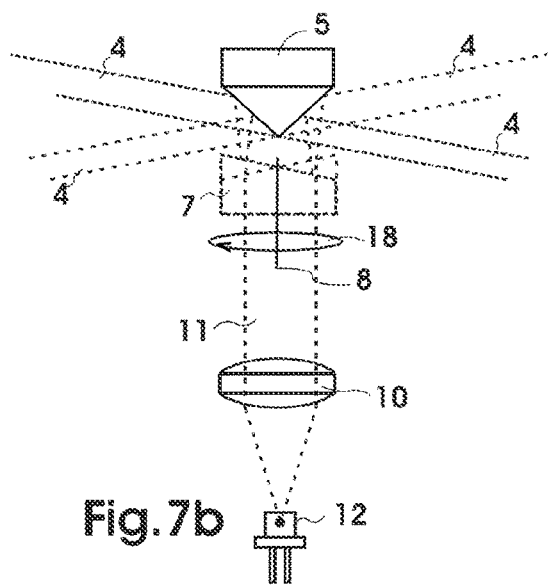

The central rays of the collimated beam impinge on the conical mirror 5 very near to the cone vertex. They will define the lower limit of the beam plane in each case, that is to say in that direction in which the beam plane rises and in the diametrically opposite direction in which the beam plane falls. Since the collimated beam is inclined relative to the perpendicular 8 and thus the conical mirror axis, the outer rays of the beam propagate toward the perpendicular axis 8 on one side, however, whereas the outer rays propagate away from the perpendicular axis 8 on the diametrically opposite side. Accordingly, the outer rays of the collimated beam impinge on the conical mirror 5 at different heights in each case. This is readily discernible in FIG. 7a. This impingement at different heights has the effect, after the deflection by the conical mirror 5, that the thickness of the beam plane is different toward the different directions. FIG. 7b shows that the thickness of the beam plane changes in a direction according to the change in the beam inclination. In this case, FIG. 7b shows the same assembly as FIG. 7a, except that here the location of the beam paths is additionally shown in a dash-dotted manner for a position of the angular prism rotated further by 180°.

It should be noted that the different thickness has an effect in the event of the determination of when the wobbling beam plane sweeps over a light receiver.

This effect is accurately calculable, however, and can be compensated for computationally. Moreover, the vertex of the conical mirror can almost touch the surface of the angular prism without beam shadings of the beam plane if the angle of inclination of the beam plane corresponds exactly to the prism angle, which is the case given a refractive index of 2.0 for the material of the angular prism. The corresponding imaging aberrations that result in the varying thickness are thus noncritical in practice.

Figure 7C:
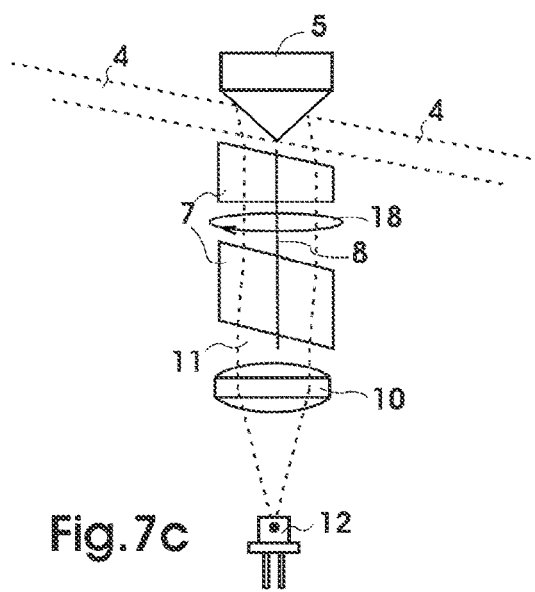

FIG. 7c shows that and how the above-described offset problems that alter the beam plane thickness can largely be compensated for optically. The optical elements used for beam deflection in this exemplary embodiment comprise, in addition to an angular prism 7 once again used, a plane-parallel plate arranged between the collimator 10 and the angular prism 7 in the beam path, said plane-parallel plate being tilted relative to the axis of the collimated beam. The tilted plane-parallel plate is coupled to the angular prism 7 for conjoint rotation, such that the tilted plane-parallel plate concomitantly rotates upon rotation of the angular prism 7 in FIG. 7c. In this exemplary embodiment, the beam deflecting component thus also comprises a tilted parallel plate in addition to the angular prism.

Figure 7D:
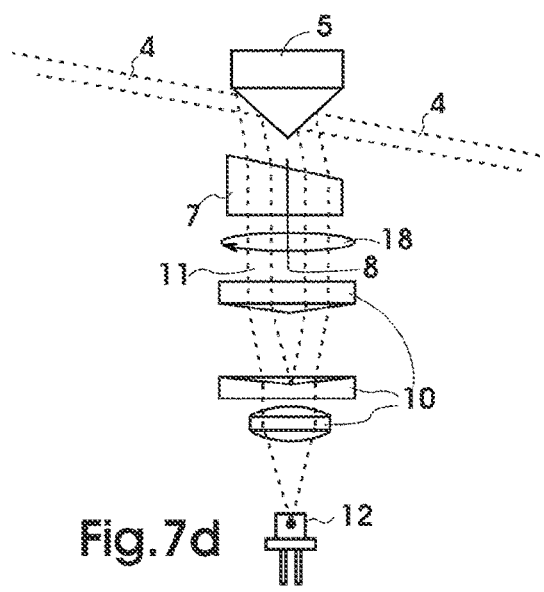

FIG. 7d shows a further embodiment, which differs from that in FIG. 7a insofar as in FIG. 7d the parallel collimated beam is reshaped into a ring beam, that is to say has an intensity over the cross-sectional area which is only low in the center and which has a ring-shaped region of higher intensity at a distance from the center. This ring beam profile is obtained by two axicons being added to the collimator. The ring beam profile has advantages with regard to the divergence of the beam plane in the vertical, for which reason a beam of given power is still detectable at a greater distance from the base station 2. The range of a base station 2 and the measurement accuracies achievable with a base station 2 can be improved using such a ring beam profile.

Figure 7E:
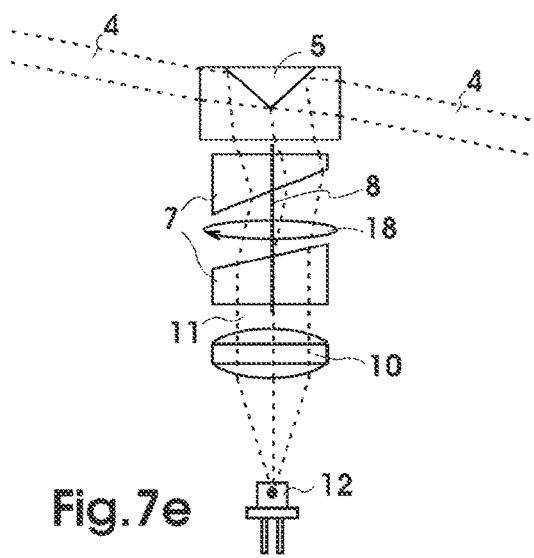

In the exemplary embodiment in FIG. 7e, the conical mirror 5 from FIG. 7a is replaced by a 90° planoconcave axicon. In the exemplary embodiment, the planoconcave axicon illustrated is formed as a right circular cylinder with a plane end face toward the light transmitter 12 and with a conical recess on the end face that faces away from the light transmitter 12. The surfaces of this planoconcave axicon are optically polished. A beam that enters the plane end face of the planoconcave axicon from the side of the light transmitter 12 is deflected by total internal reflection at the conical recess and emerges from the lateral surface. The use of such a planoconcave axicon has advantages for the mechanical design of a base station 2 because the axicon—unlike a conical mirror—can be held easily without a glass tube, a glass housing or even nontransparent clip structures shading parts of the beam or attenuating beams as they pass through.

By virtue of its cylindrical shape, the axicon shown, in particular below the beam exit region, can be held with little outlay jointly with the rotating beam deflecting optical elements coaxially with respect to the rotational axis, for example in a suitable tube. However, it should be pointed out that the vertex of the conical recess of the axicon cannot be arranged as near to the exit surface of a beam deflecting angular prism as is the case for the vertex of the conical mirror 5 from FIG. 7a. Since for this reason the above-described deflection—resulting in different beam plane thicknesses—by the rotating angular prism would have a greater effect, it is preferred to use, where instead of the conical mirror 5 a planoconcave axicon is used, instead of the single rotating angular prism from FIG. 7a two angular prisms working in relation to one another, which deflect the beam to different extents and which jointly ensure that the deflected beam impinges centrally or almost centrally on the conical surface of the planoconcave axicon.

Figure 7F:
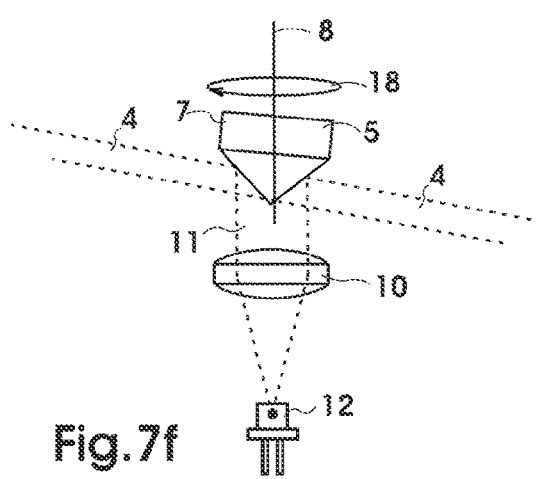

An embodiment which admittedly does not yield particularly high measurement accuracies, but does permit particularly small structural sizes and extremely low costs, is shown in FIG. 7f. In this exemplary embodiment, the means for beam deflection is identical to the means for beam-to-beam plane expansion. In other words, here the beam deflecting component 7 is identical to the beam plane expanding component 5. In this case, a conical mirror 5 is used, the axis of symmetry of which is tilted by an angle alpha/2 with respect to the rotational axis 8 (perpendicular in FIG. 2). This constitutes an outstandingly simple solution, but is beset by problems in the stability of the deflection, since dynamic errors of the mechanical mounting of the rotational axis in the case of a customary design and customary angles of inclination of the normal to the wobble plane have an effect more than 10× greater than in the case of the arrangement from FIG. 7a. This variant from FIG. 7f should therefore only be given preference if what is important is not extremely high measurement accuracy, but rather extremely small structural size and extremely low costs, such as e.g., in the case of the miniaturized integration of the base station into a smartphone or the like.

The optical components shown allow an advantageous optomechanical design of base stations 2. This will be explained by way of example with reference to FIG. 8 for a mechanical set-up of an embodiment that largely corresponds to the configuration from FIG. 7a.

Figure 8:
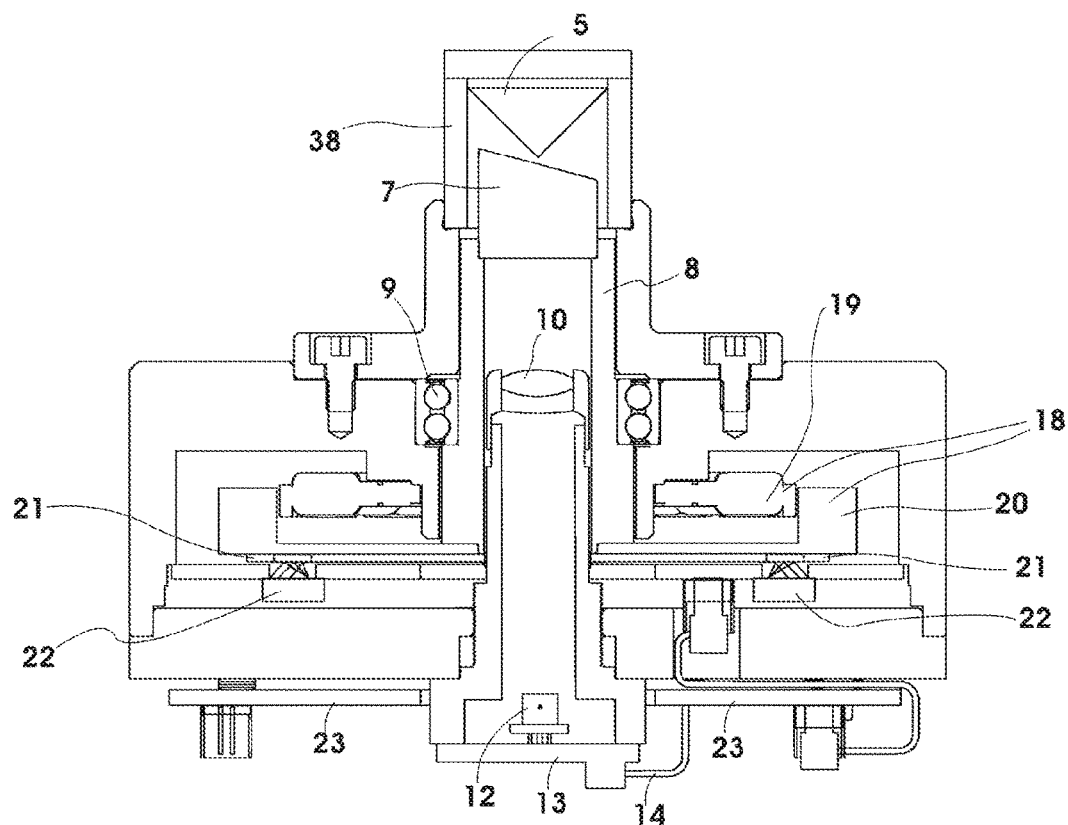
FIG. 8 shows a sectional view through optomechanics of the base station, according to an example embodiment of the present invention.

In this case, FIG. 8 shows a sectional view through the optomechanics of this particularly preferred variant of the base station 2.

In this case, the optoelectronic beam transmitting element 12 is a laser diode that emits a divergent beam. The divergent beam is converted into a parallel beam, said beam being focused (on infinity), by a collimator lens 10. As is evident, the laser diode 12 and the collimator lens 10 are mounted fixedly with respect to one another. They are situated in the interior of a hollow shaft 8, which is rotatable around them and which is fixedly connected to the angular prism 7; more precisely, the angular prism is inserted into the hollow shaft.

The hollow shaft is mounted such that it is rotatable by a bearing unit 9, which is pretensioned without play, and is driven by the rotary drive realized as a brushless motor 18 and is thus caused to rotate jointly with the angular prism. For this purpose, the motor 18 comprises a stator 19 and a magnetic rotor 20 connected to the hollow shaft for conjoint rotation. In this case, an encoder disk 21 is simultaneously fitted on the rotor, and is scanned by two encoder read heads 22. From the signals obtained during the scanning of the encoder disk 21 with the aid of the encoder read heads 22, the rotation angle of the magnetic rotor can be determined in real time and at the same time a centering error of the encoder disk and bearing run-out can be compensated for.

Since the collimated beam deflected by the angular prism is incident on the conical mirror 5, which, as discussed above, expands the beam to form an oblique beam plane and results in the desired known wobbling of the beam plane upon rotation of the angular prism, from the signals which are obtained by the encoder read heads 22 as a result of the scanning of the encoder disk 21 not only is it possible to determine the rotation angle of the magnetic rotor in real time, but at the same time the rotational alignment of the angular prism and therefore the phase angle in the movement cycle of the beam plane normal 6 are also known.

In order to protect the optical components, the base station comprises, on the beam exit side, a transparent cover 38 shaped as a glass housing or preferably as a glass tube closed at the end side, through which cover the wobbling beam plane emerges into the measurement space to be measured.

For controlling in particular the beam emission by the laser diode 12 and the rotary drive by the motor 18, a control unit 23 is provided, which detects the electrical rotation angle signals of the encoder read heads 22 and generates therefrom a data signal 14 (angle-encoded with the aid of angle calibration data), which is fed to the driver circuit 13 of the laser diode 12 for the modulation of the radiation power.

Figure 9:
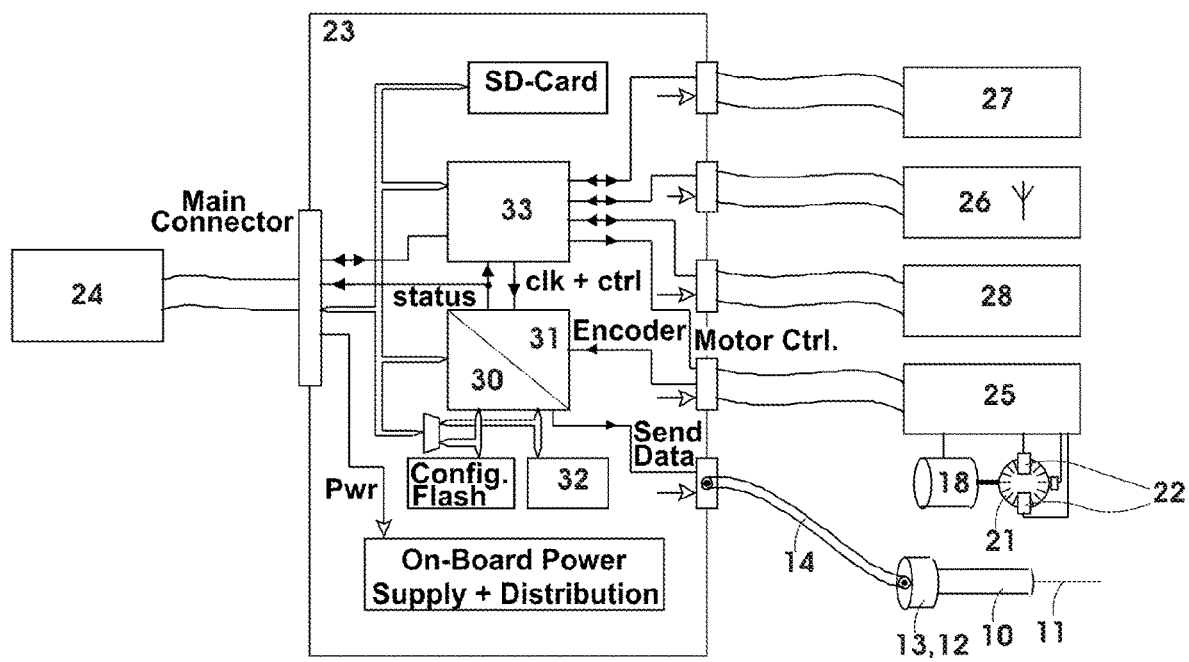
FIG. 9 shows a block diagram of a control circuit of the base station, according to an example embodiment of the present invention.

FIG. 9 shows a block diagram of said control unit. The control unit comprises a power supply 24 and interfaces for calibration and debugging. The control unit furthermore comprises suitable encoder and motor electronics 25, via which it is connected to the motor 18 and the encoder read heads 22 such that a central computing unit 33 can define the rotational speed of the motor.

Preferably, the controller furthermore manages not only a user interface 27 but also a wireless reader 26—embodied e.g., using RFID or NFC technology—for position tags or transponders 37 that can be arranged on the stand 36 or attached to the connection point between stand and base station (e.g., to the tripod, tribrach or leveling plate) and correspond to previously ascertained absolute positions, such as can be measured for instance in advance of surveying by means of static GNSS. Such a reference to absolute positions calibrated by means of static GNSS or tachymetrically, for example, for the stands of the base stations makes it possible, where a virtual guide line is desired, to establish an extended virtual guide line with only a small number of base stations that move along according to construction progress, which results in a considerable reduction of costs by comparison with the prior art with at the same time improved handling by the users.

It should be mentioned that the approach of the calibration of base station installation points with respect to static absolute positions, in particular with the aid of static GNSS or tachymeters, and storage of these data in a transponder on the stand or installation point of the base station is considered to be advantageous by comparison with the prior art and it is considered to be inherently protectable to set up e.g., a virtual guide line with base stations which move along from one statically calibrated position to a next statically calibrated position according to construction progress. The right to file divisional applications directed thereto is explicitly reserved. It should be emphasized that such a method is also applicable using conventional base stations that do not emit beam planes wobbling in a defined and detected way. This method is likewise applicable in particular to tachymeters known from the prior art and to dual-slope lasers and the like.

Where the controller 23 is configured to detect absolute positions, for example absolute positions of previously measured position tags, the control unit 23 is preferably configured to modulate the beam that can be received by the active targets in such a way that the absolute position of the respective base station 2 is communicated to said active targets regularly, for example every few seconds. The absolute position in this respect constitutes auxiliary information that can be modulated on the radiation emitted by the base station. It should be mentioned that there is optionally also the possibility of providing the base station 2 with a dedicated GNSS receiver, which can obviate a prior measurement of desired installation positions for the base stations 2.

The base station 2 furthermore comprises an inclination compensator 28, which outputs an inclination-indicative signal to the controller 23, which signal can likewise be used for the repeated modulation of the emitted radiation.

In the preferred embodiment illustrated, the control unit 23 comprises an interpolation circuit 31, by means of which those data words which encode the angular positions are output at positions calibrated exactly with respect to the encoders. By virtue of corresponding correction data being stored in a calibration memory 32, in this case encoder disks with relatively poor linearity can be calibrated so accurately that highly accurate angle data are generated despite relatively poor linearity. The correction data necessary for this purpose can readily be determined and stored during production for each encoder disk; it should be pointed out that the calibration memory can be designed in particular as a nonvolatile memory.

The interpolation circuit 31 converts the angle data related preferably to integral indexes for fixed angular steps, and preferably also other auxiliary information, into a data format suitable for the modulation of the radiation and in this case, also ensures the presence of redundancies and checksums as necessary.

One variant that is preferred over the transmission of angle information at fixed angular positions consists in transmitting angle information at fixed time intervals. The angles thus given at fixed points in time can be determined in the base station by interpolation of the angle encoder data and can then be transmitted as angle information at the fixed points in time. This has the advantage that at the active counterpart station the beginning of data words can be detected very well even without emphasized start pulses. This in turn is advantageous because the available laser power can be better utilized and the range of the base station can thus be increased.

As data formats appropriate for optical data transmission, for example the MPPM format or a modified MPPM signal with eight symbols, i.e., optical pulses, at 128 positions should be mentioned, which allows an encoding of 40 bits of information per data word. The use of a PPM data transmission protocol, that is to say also of data protocols other than the MPPM protocol, for modulation onto the measurement radiation emitted by base stations is considered to be inventive per se, specifically also for base stations, rotary lasers and the like that are otherwise designed according to the prior art.

Before this data protocol used is explained in greater detail, the set-up of the active counterpart station 3 will be discussed. This is expedient insofar as the data protocol advantageously used is configured such that particularly high accuracies can be achieved with inexpensive, robust receivers.

Figure 10:
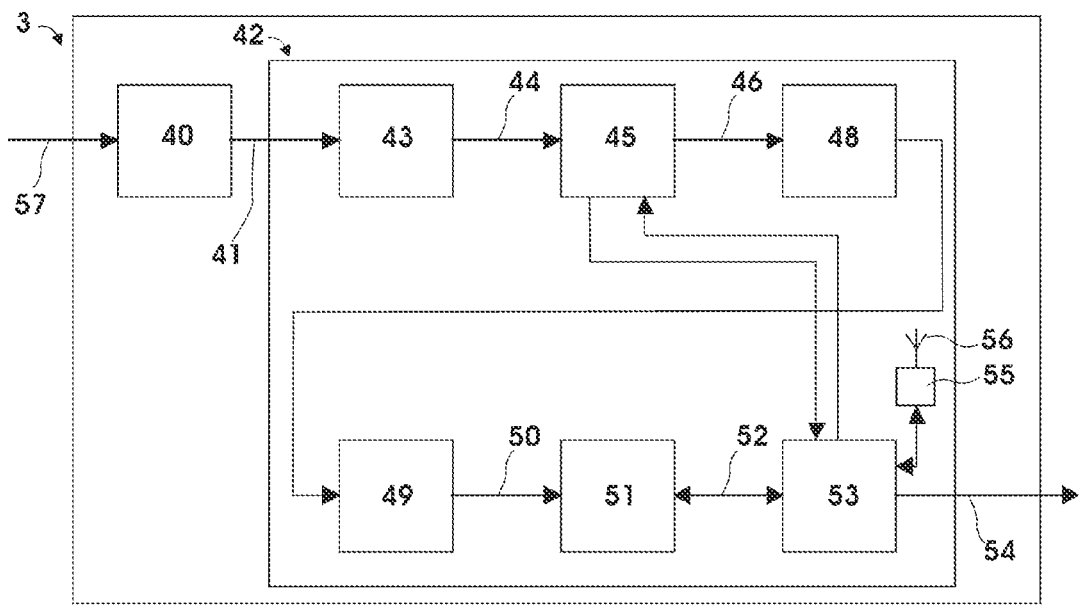
FIG. 10 shows a block diagram of an active target, according to an example embodiment of the present invention.

FIG. 10 shows the block diagram of the active counterpart station associated with the above-described base station 2, i.e., of the active target 3. The active target 3 comprises, particularly for use with construction machines, a receiving collimator 40, by which light is focused onto a light guide 41 and is coupled into the latter. The light guide 41 guides radiation arriving from the base station 2 onto a light-sensitive optoelectronic element such as a photodiode. The light guide 41 can be a polymer optical fiber (POF), in particular, which can have a length of a plurality of meters and allows a spatial separation between the entrance region for radiation into the active target 3 and the optoelectronic and electronic components used for the detection and evaluation of a radiation reception signature.

When the beam plane sweeps over the receiving collimator 40, the light radiation is focused onto the light guide 41 and coupled into the latter. The receiver 42, which can be realized as an independent component and, in the case of construction machine applications, for example, can be fitted securely in the machine interior, is thus connected to the outside world only via the light guide 41, which can have a length of a plurality of meters.

In the case of such an assembly, the actual measurement point lies on the receiving collimator 40, which can be attached to the exterior of a construction machine, which affords considerable advantages inter alia with regard to the total vibration sensitivity and the water-tightness of the assembly. An optical filter for suppressing stray optical radiation can be assigned to the light-sensitive optoelectronic element, wherein a bandpass filter 43 having a wavelength passband with a width of only a few nanometers around the emission wavelength of the base station 2 is typically used. Said filter can lie for example upstream of an entrance lens into the receiving collimator 40, within the receiving collimator 40, between the receiving collimator 40 and the light guide, or between the light guide and the light-sensitive electronic element. It is preferred here, however, to provide the optical filter as near as possible to the optoelectronic element, since a filter having only a small structural size is typically usable in such a case, which affords price and weight advantages.

The preferably optically filtered light is then incident as an optical reception signal 44 on the light-sensitive optoelectronic receiving element 45. It is particularly preferred to use for this a customary avalanche photodiode (APD) or a linearly operated silicon photomultiplier, the bias voltage of which is controlled by the computing unit 53.

The light-sensitive optoelectronic receiving element outputs an electrical signal, which is passed into a signal conditioning circuit 48, a transimpedance amplifier (TIA) with an analog matched filter being used in the present example. The analog output signal obtained after signal conditioning is in turn converted into data of a digital data stream 50 by a high-speed ADC 49. Said data stream is fed to a digital preprocessing and compression circuit 51, which digitally conditions the received data stream further by eliminating from the data stream noise and useless or disturbing signals such as disturbance events as a result of scattered light, in order to feed to a downstream computing unit only those data of the data stream which are actually necessary for further processing. Such a digital data stream conditioning thus compresses the data stream.

It is advantageous that such a data compression is able to be carried out using particularly inexpensive data processing units, in particular because the same data processing steps have to be carried out repeatedly. Particularly configurable modules such as FPGAs are suitable for such steps. Since these have only a low power consumption and make it possible to use a computing unit having comparatively low computing power for the further processing of the compressed data stream, the use of a data compression is advantageous overall. It should be mentioned in this regard, in particular, that the use of an FPGA-based data compressor enables the power consumption otherwise required to be reduced to approximately $1/10$, which is advantageous particularly where the active targets 3 are intended to be configured as fully integrated handheld receivers supplied by means of batteries, preferably fully integrated handheld receivers without the abovementioned light guides. It should be mentioned, however, that particularly where the power consumption is of secondary importance at most and a computing unit with sufficiently high computing power is simultaneously available, the compressor 51 could also be dispensed with.

It should be mentioned as being preferred that the receiver, i.e., the active target 3, is furthermore equipped with communication interfaces 54, in the present case in particular for the radio link via WLAN, in order as necessary to communicate with other active targets 3 and to pass on calculated position information.

By means of the measuring assembly 1 described, comprising the base station 2, which generates a beam plane wobbling in a known way, and an active counterpart station 3, it is possible to determine at what angle relative to the horizontal an imaginary connecting line between the active counterpart station, on the one hand, and the wobble center of the beam plane, on the other hand, said wobble center lying in the base station two, rises. This angle of inclination is referred to hereinafter as a vertical direction angle. It is designated by the Greek letter λ (lambda) in FIG. 2.

If, in accordance with FIG. 2, the intention is to indicate the position of the active counterpart station 3 relative to the base station 2 in spherical coordinates, the center point of which is the center of the beam plane wobble movement, then a horizontal direction angle and the distance with respect to the base station 2 are also required in addition to the vertical direction angle. It goes without saying that a direction with 0° has to be defined for the vertical direction angle and the horizontal direction angle. For the vertical direction angle, an exactly horizontal direction with a gradient of zero is particularly excellent. For the horizontal direction angle, by contrast, the direction can be defined arbitrarily per se. While directions such as north would be particularly excellent in practice, in the present case it can be regarded as sufficient if the horizontal direction angle is related to that direction defined as 0° to which the phase angle in the movement cycle of the beam plane normal is related. It has already been explained in this regard above that the phase angle in the movement cycle of the beam plane normal corresponds to a rotation angle of the rotary motor driving the angular prism, and that said rotation angle can be determined by means of an angle encoder. Without restricting the generality, the 0 direction thereof can be used for defining the horizontal direction 0°.

The use of the above-described optics in the base station 2 has the effect, on account of the wobble movement generated in a targeted manner, that the beam plane normal 6 rotates on a circle as illustrated in FIG. 2, wherein each active counterpart station 3 is swept over twice per circular rotation, that is to say per wobble cycle (in any case insofar as the radiation entrance surface of the active counterpart station 3 is situated between the highest height and the lowest height that can be assumed by the beam plane). The sweeping over occurs at specific phase angles. If the two phase angles $\psi_1$ and $\psi_2$ at which the active counterpart station is swept over are known, then the horizontal direction angle is firstly calculated simply from their average value, that is to say corresponds to $(\psi_1+\psi_2)/2$.

For determining the vertical direction angle λ (lambda), that is to say the rise or fall angle of an imaginary connecting line between, on the one hand, the active counterpart station and, on the other hand, the wobble center of the beam plane, said wobble center lying in the base station 2, it is necessary additionally to use the angle at which the normal 6 to the beam plane 4 is inclined relative to the perpendicular axis 8. This angle is designated as angle α (alpha) in FIG. 2.

With given phase angles $\psi_1$ and $\psi_2$ at which the wobbling beam plane 4 sweeps over the active counterpart station 3, with these variables it is possible to calculate the vertical direction angle λ (lambda) in accordance with:

$$\lambda = a\tan\left(\tan(\alpha)\cdot\cos\left(\frac{\psi_2-\psi_1}{2}\right)\right)$$

Figure 3:
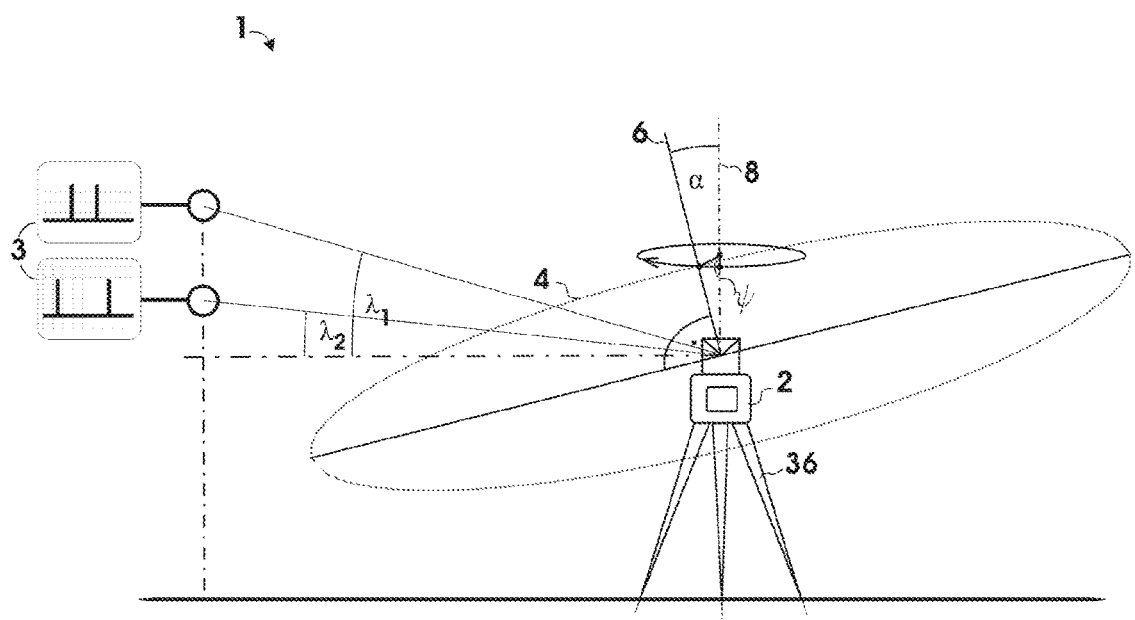
FIG. 3 shows a measuring assembly with an active target according to an example embodiment of the present invention, the reception signature of the active target being represented for two different heights.

FIG. 3 shows symbolically in this respect how the spacing of the sweeping-over events is affected if the active target at a given distance from the base station 2 varies its height. The change in height is accompanied by a variation of the temporal spacing of the sweeping-over events because the beam plane 4, depending on the target height, requires a different period of time in order, after a first sweeping over, to continue to wobble to an alignment in which the second sweeping over is observed. The time durations of different lengths clearly correspond at the same time to rotations to different extents of the beam plane normal 6 going through its movement cycle. It is also evident from FIG. 3, however, that the average point in time between the two instances of sweeping over is not dependent on the target height. It should be emphasized that this behavior fully accords with and is expressed in the formulae indicated above.

It should be noted, however, that in the case of the simple assembly such as that from FIG. 2, firstly only the signature of the repeated sweeping over of the active counterpart station 3 by the beam plane 4 is detected, but in this case it is not unambiguous as to whether an observed signature occurs at a height above or below the horizontal. (In the equation above, that has an effect as a result of sign ambiguities.)

Although it would be possible to avoid such an ambiguity by restricting the measurement space to a half-space, it is also possible using comparatively simple measures to resolve the ambiguity without such a significant restriction of the measurement space. In this respect, attention shall be drawn to the possibilities that are described below with reference to FIGS. 4-6.

Figure 4:
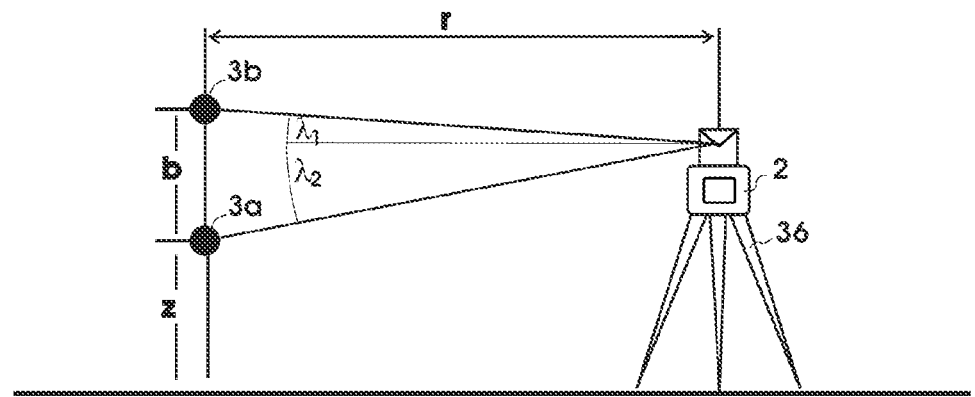
FIG. 4 shows a measuring assembly with an active counterpart station comprising two receivers, one vertically above the other, at a known distance b, in order to eliminate ambiguities and to determine 3D coordinates relative to a base station, according to an example embodiment of the present invention.

FIG. 4 shows a proposal for resolving the ambiguity by arranging two active counterpart stations 3a and 3b one above the other, which makes it possible to unambiguously ascertain the heights of the individual active counterpart stations from the hence four instances of sweeping over detected. It should be emphasized that, optionally, it is not necessary to use two identical, completely separate active counterpart stations, rather that it is likewise possible to provide a single counterpart station with two light receivers or light collimators arranged one above the other. A particularly suitable active counterpart station 3 thus has more than one individual light receiver. What is particularly advantageous about this assembly is that where the vertical distance b between the light receivers arranged one above the other is known, the distance between the active counterpart station 3 and the base station 2 can also be determined. Accordingly, having recourse to the base distance b, it is possible, given a known height of the beam wobble center, to calculate the height coordinate z of the active counterpart station 3 and the distance r between the active counterpart station 3 and the base station 2.

Accordingly, by means of a receiver assembly as illustrated in FIG. 4, it is possible to determine the 3D position of the active target 3 in the polar coordinate system of the base station. It should be pointed out that where additional receivers are provided, the accuracy can be increased by interpolation and/or, given suitable positioning of even further additional receivers on the active counterpart station 3, the orientation of the active counterpart station 3 in space also becomes detectable.

Moreover, it is advantageous if, without adversely affecting the measurement accuracy, it is possible to permit the connecting line between the two receivers 3b and 3b to run not exactly vertically, but rather in a manner tilted relative to the vertical. In one preferred embodiment of the active counterpart station 3 described with reference to FIG. 4, the active counterpart station 3 is therefore provided with an inclinometer, the measured values of which can be used for compensation of a current tilting.

Figure 5:
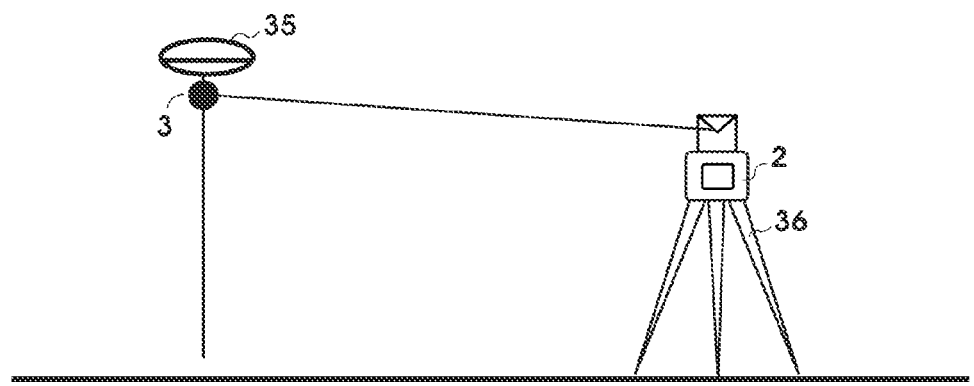
FIG. 5 shows a measuring assembly with an active target, the latter being assigned a GNSS antenna for eliminating an ambiguity, where the 3D coordinates of the GNSS antenna can be improved by the active target, according to an example embodiment of the present invention.

FIG. 5 shows as an alternative and/or additional possibility that the ambiguity can be resolved by linking the active target 3 with the position and/or location information of a GNSS antenna. At the same time, where the absolute positions determined by means of GNSS are required, the accuracy of the GNSS measurements can be increased if reference is made to a calibrated absolute position of the base station 2 and the positions determined relative thereto with the active counterpart station 3. The accuracy of the GNSS position can be significantly improved in particular with regard to the height measurement. The assembly is advantageous in this respect in particular where highly accurate absolute positions are absolutely necessary.

Figure 6:
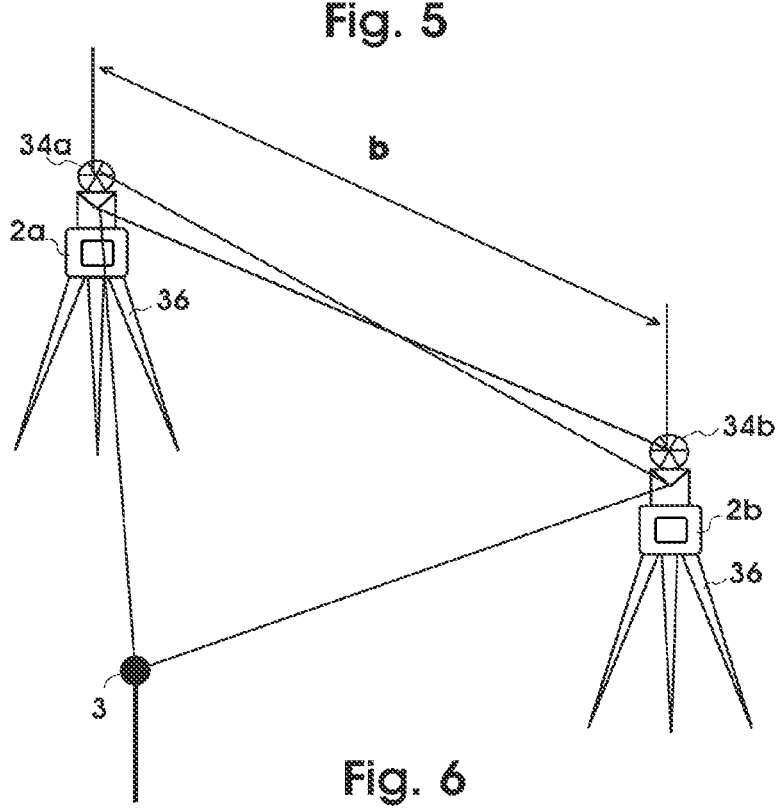
FIG. 6 shows a measuring assembly with two base stations for eliminating an ambiguity with base distance b and for determining 3D coordinates of an active target, according to an example embodiment of the present invention.

FIG. 6 shows a further assembly, by means of which an ambiguity is automatically resolvable. In this case, two base stations 2a and 2b are installed with a known base distance b and are calibrated with respect to one another with regard to their horizontal axes. For an active target 3 that is situated in the measurement space of both base stations, that is to say can receive the radiation from both stations for measurement purposes, the 3D position of the active target 3 can then be determined by 3D triangulation.

In this case, particular preference is given to an implementation such that passive targets 34a and 34b are fitted on each of the two base stations 2 used, specifically preferably in alignment with the rotational axis of the respective other station, wherein the base stations then, as described above, are themselves also designed for receiving radiation, specifically in such a way that in addition to horizontal angles and vertical angles, by determining a pulse time of flight from a first base station to the reflective passive target of the second base station and back, it is also possible to measure the transverse distances between the two base stations.

Such a configuration has the advantage that the stations can automatically calibrate themselves upon installation and the information obtained about the respective neighboring station can be concomitantly transmitted to an active counterpart station 3 as auxiliary information by means of a modulation of the radiation, without said active counterpart station having to initiate the calibration process or interrogate the results thereof by way of a radio interface. In this case, the installation process is as simple as in the case of a total station.

As far as the height determination is concerned, in all variants it would be sufficient, in principle, merely to determine the sweeping-over times and then to assume a synchronous rotational speed of the angular prism. However, this not only limits the accuracy as soon as fluctuations in synchronism occur, but also does not permit the complete determination of all coordinates of the active counterpart station 3. It was therefore assumed in the explanations above that the actual rotation angles of the angular prism rotation or the phase angle in the movement cycle of the beam plane normal itself shall be known.

It has already been pointed out that corresponding information can be ascertained by means of an angle decoder and corresponding angle data can be modulated on the radiation from the base station 2.

Details concerning a data protocol that is particularly suitable for the modulation of the optoelectronic beam transmitting element, here the laser diode 12, will now be described with reference to FIGS. 11a-11d.

In this respect, it should firstly be recalled that the wobbling beam plane 4 as explained above has a thickness which can vary in different directions but is in any case regularly finite. Accordingly, during the process of sweeping over the receiver, a finite time elapses from when the first rays impinge on the receiver until the last rays move away from the receiver. Firstly, the time of this beam reception is sufficient for receiving encoded information. Secondly, during this time, the wobbling beam plane will also continue to move, i.e., the phase angle of the beam plane normal 6 changes during the sweeping over.

This can firstly be used for receiving a sequence of temporally encoded data and can secondly be taken into account in order to increase the measured value precision.

It is preferred to transmit for this purpose in particular a respectively current rotation angle alignment of the rotating angular prism and thus information about a respectively current phase in the movement cycle of the beam plane normal from the base station 2 to the or each active counterpart station 3. A suitable protocol for data which can be modulated on the radiation emitted by the base will be explained with reference to FIGS. 11a-11d.

Figure 11A:
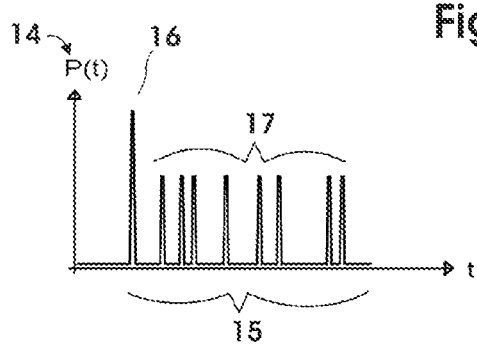
FIGS. 11a-11d show examples and elucidations concerning a possible configuration of the angle-encoded data signals in the base station and after reception in the active target, according to example embodiments of the present invention.
Figure 11B:
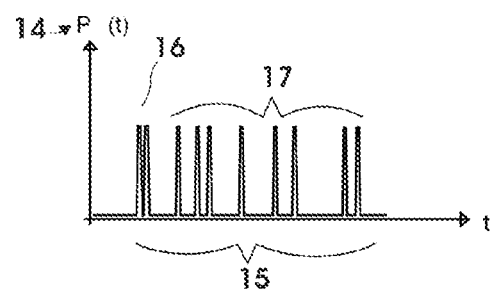
Figure 11C:
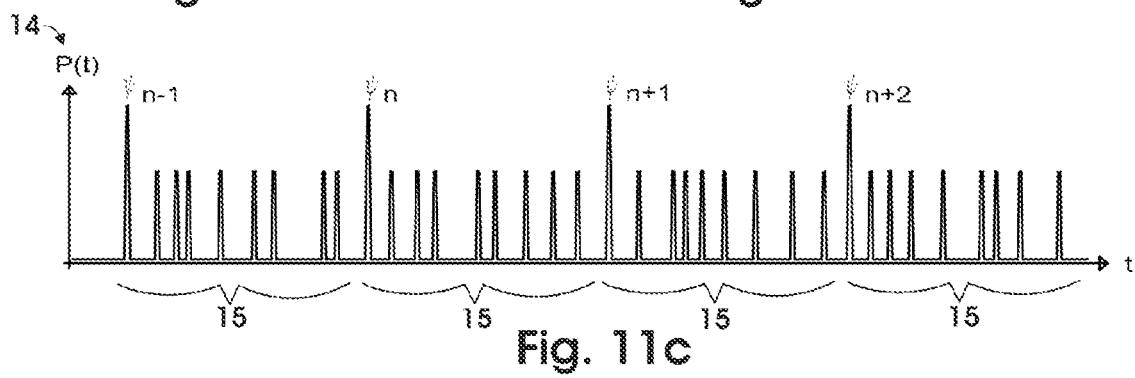

In this respect, FIGS. 11a-11c show the temporal profiles of the radiation power of the radiation emitted by a base station, said profiles being characterized by the information modulated thereon.

Accordingly, the preferred implementation illustrated uses a here 40-bit wide data word 15 constructed in each case from a start symbol for the synchronization, said start symbol being easily recognizable at the receiver, and from 8 subsequent data symbols. The respective symbols are realized by generally needle-shaped pulses.

The desired information is encoded with the temporal position of the eight needle-shaped pulses which correspond to the data symbols and which follow each start symbol before a new start symbol is generated. In the exemplary embodiment illustrated, each of the eight needle-shaped pulses lies at one of 128 encodable time positions. This results, as shown in FIG. 11c, in a temporal variation of the modulation pattern according to the data to be transmitted. The start symbol differs from the data symbols in order that it is recognizable particularly easily. There are various possibilities for this. According to FIG. 11a, a pulse that is stronger than the pulses of the data symbols is used for the start symbol. Such an encoding is referred to as bilevel encoding. According to FIG. 11b, a double pulse constructed from two needle pulses that are very close together temporally is used instead. The temporal spacing of the pulse peaks of the double pulse that are very close together is so short that it does not appear in the rest of the data word. The temporal spacing of the double peaks is thus smaller than the shortest time spacing of the 128 encodable time positions.

It should be pointed out that the start symbols do not just serve for identifying a new data word. Rather, a synchronization can also be derived from the temporal sequence of the start symbol pulses, i.e., at the active counterpart station 3 it is possible to determine how long the base station 2 requires for transmitting a complete data word, and from that it is possible to derive the duration of the time intervals between the 128 time positions encoded in accordance with the protocol. In this case, the synchronization can be effected for instance—assuming corresponding computing power in the active counterpart station 3—by way of autocorrelation with respect to the time spacing of the start symbol pulses.

Furthermore, for better utilization of the radiation power of the beam transmitting element and thus in order to increase the achievable range, it can be preferred for the start symbols not to be bilevel-encoded, i.e., not to be transmitted with a distinguishable amplitude in comparison with the data pulses, nor for double pulses to be transmitted at the beginning of a data word. Furthermore, specific start pulses could even be completely omitted. In such cases, it is possible to use e.g., brute force decoding by means of checksums or soft decoding or autocorrelation with the use of fixed time spacings of the data words for synchronization purposes.

FIG. 11c shows a sequence of a plurality of different angle-encoded data words 15 which respectively encode the rotation angle positions $\psi_{n-1}$ to $\psi_{n+2}$ which were detected at the points in time of the start pulses.

The data protocol allows a sufficiently rapid and disturbance-free data transmission by way of the modulation of the emitted radiation. In one practical embodiment, it was possible, for instance, to transmit a data word 15 as described within 2.5 µs. This allows a sufficiently frequent transmission of current rotation angle information and/or auxiliary information.

It should be pointed out that with the transmission method described, latency problems in the transmission between base station and active counterpart station become practically insignificant. Although there can be a temporal delay between the detection of a specific rotation angle position by the angle decoder in the base station 2 and the modulation of corresponding information onto the emitted radiation, this latency occurs within the base station and will moreover be very constant over time to a good approximation—that is to say, for instance, disregarding temperature effects, which can however be reduced by temperature regulation. In this respect, this transmission differs from a communication of current angle information by way of other communication paths such as Wi-Fi, for instance, because latencies can vary greatly in that case. The data transmission described is therefore particularly advantageous, which also applies to base stations according to the prior art with a non-wobbling beam plane.

A so-called pulse position modulation (PPM) is employed in the implementation described above. It shall be disclosed that further modulation methods such as are known per se from the prior art would be applicable besides such a PPM modulation. In particular, the usability of Manchester encoding, and of the PSK, QPSK, QAM modulation methods, shall be explicitly disclosed, without restriction.

The measurement accuracy can then be increased with the transmission of the angle encoder data by means of the modulation described. As mentioned above, it takes a certain time until the wobbling beam plane has completely swept over the receiver in the active counterpart station 3, since the beam plane has a finite thickness and the receiver has a finite extent. The alignment of the wobbling beam plane also changes during this duration. It is therefore proposed to increase the measurement accuracy by determination of the temporal centroid of the sweeping-over interval and an interpolation of the angle information—which was obtained during the sweeping-over interval by way of the modulated received radiation—with respect to the temporal centroid.

It should be noted here that the power received at the receiver of the active counterpart station 3 will vary during the sweeping over. This is readily explicable just from the fact that the complete area of the receiver is impinged on by the beam plane only for a part of the sweeping-over interval, while a part of the receiver is not impinged on by the beam plane at the beginning and end of the sweeping over. Such effects result in the presence of an envelope 47 that varies the received power, such as is illustrated by way of example in FIG. 11d.

For the interpolation of the angle information, that is to say the accurate determination of a phase angle in the movement cycle of the beam plane normal, it is necessary firstly to determine the temporal centroid of said envelope. For said temporal centroid, the relevant angle is then determined by interpolation.

However, the envelope is itself not available straightforwardly; this is also not absolutely necessary, however, because it is sufficient to consider the heights of the pulse peaks deformed by the curve. In this respect, recourse is thus had to the analog form 46 of the data stream deformed by the envelope. This is possible in a particularly simple manner by defining expedient, low reception power threshold values, upon the exceedance and undershooting of which start and stop times $t_{start}$ and $t_{end}$ are respectively determined; cf. FIG. 11d.

If it were desired thus to determine the temporal centroid between the expedient limits $t_{start}$ to $t_{end}$, the following formula can be used as a discrete approximation:

$$t_c = \frac{\int_{t_{start}}^{t_{end}} t \cdot P(t) dt}{\int_{t_{start}}^{t_{end}} P(t) dt}$$

Although the value of the temporal centroid thus obtained will depend slightly on the data content of the data words, since after all the data content is encoded via the time positions of the needle pulses, nevertheless the temporal centroid determination made possible is still very good.

Figure 11D:
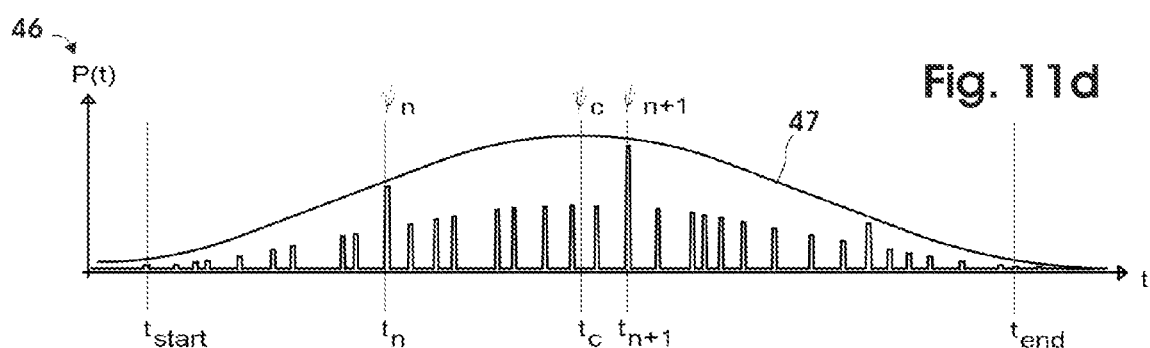
Figure 12:
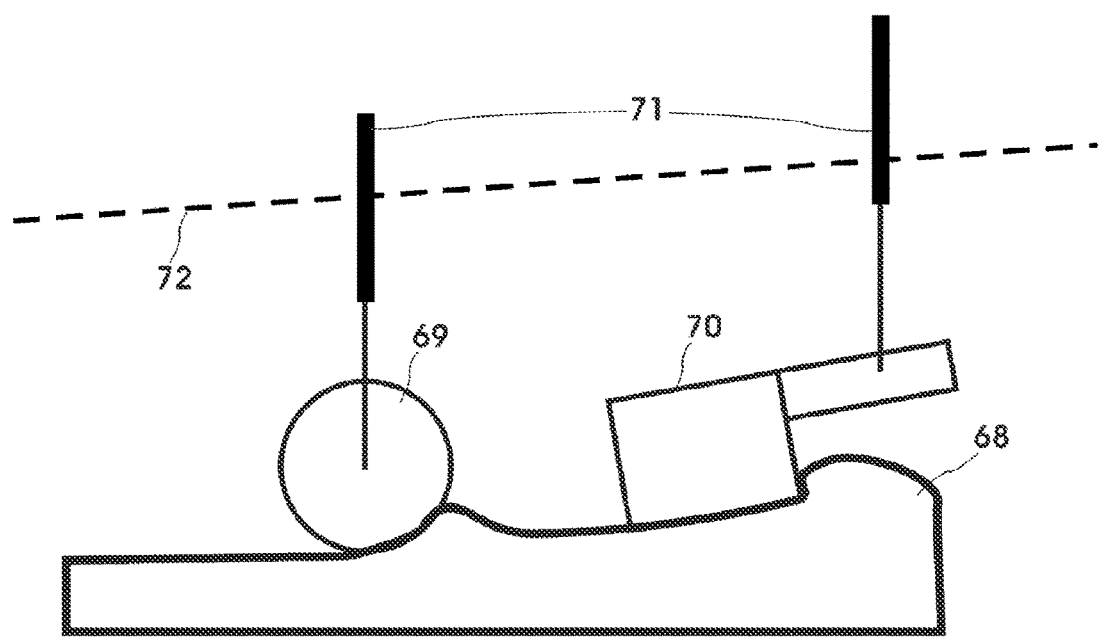
FIG. 12 shows a conventional attachment of laser sensors to construction machines in a method for guiding construction machines in road construction.
Figure 13:
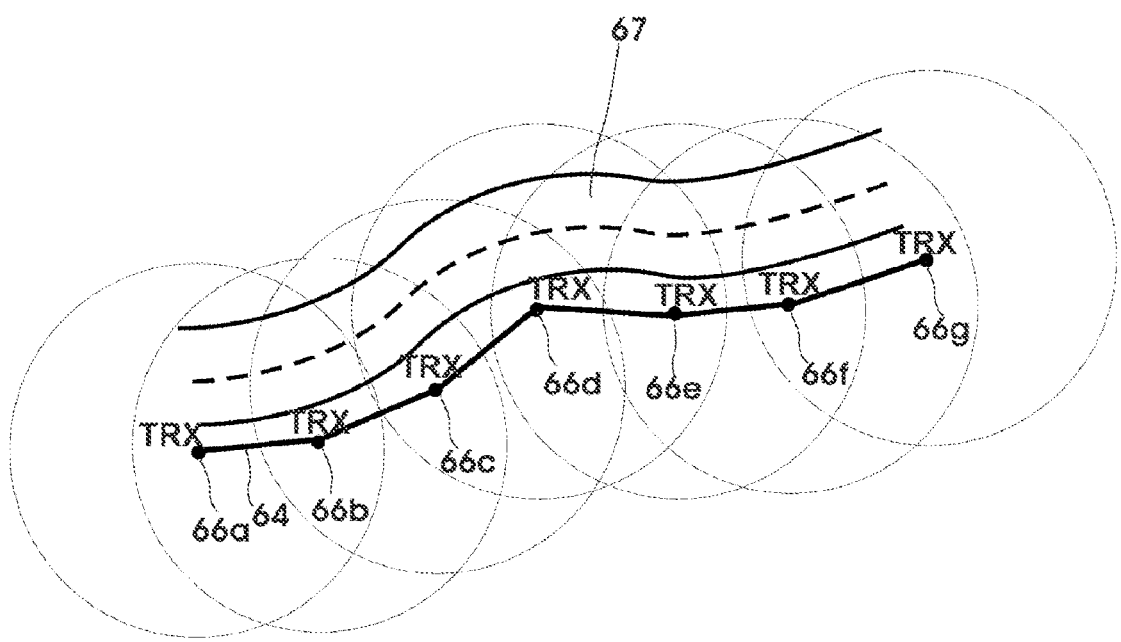
FIG. 13 shows a plan view of a course of a road in a conventional method.

In FIG. 11d, the temporal centroid is designated by $t_c$. Said temporal centroid lies between the points in time $t_n$ and $t_{n+1}$, at which points in time those start pulses are received which indicate the beginning of transmission of data words which encode the two transmitted rotation and phase angles $\psi_n$ and $\omega_{n+1}$ ascertained directly preceding and succeeding the time $t_c$, respectively.

With these designations, the interpolated angle that best corresponds to the temporal centroid of the sweeping of the beam plane over the light receiver can be determined in accordance with:

$$\psi_c = \psi_n + \frac{\psi_{n+1} - \psi_n}{t_{n+1} - t_n} \cdot (t_c - t_n)$$

This rotation angle can then subsequently be used for the calculation of a direction angle in accordance with the formulae indicated above.

This procedure can be used to interpolate between the angular steps encoded by the transmitted data words significantly better than with 1/10 of the angular step spacings. Accuracies of better than 2 angular seconds can typically be obtained in this way. In this regard, vertical angle resolutions of 0.17 angular second were achieved in a practical embodiment of a base station 2 whose wobbling beam plane was extended with an aperture angle α (alpha) of +−5°.

The high accuracies and the simple and thus inexpensive mechanical set-up allow the measuring system disclosed to be used in particular in applications such as road construction and/or for the definition of virtual guide lines.

Figure 14:
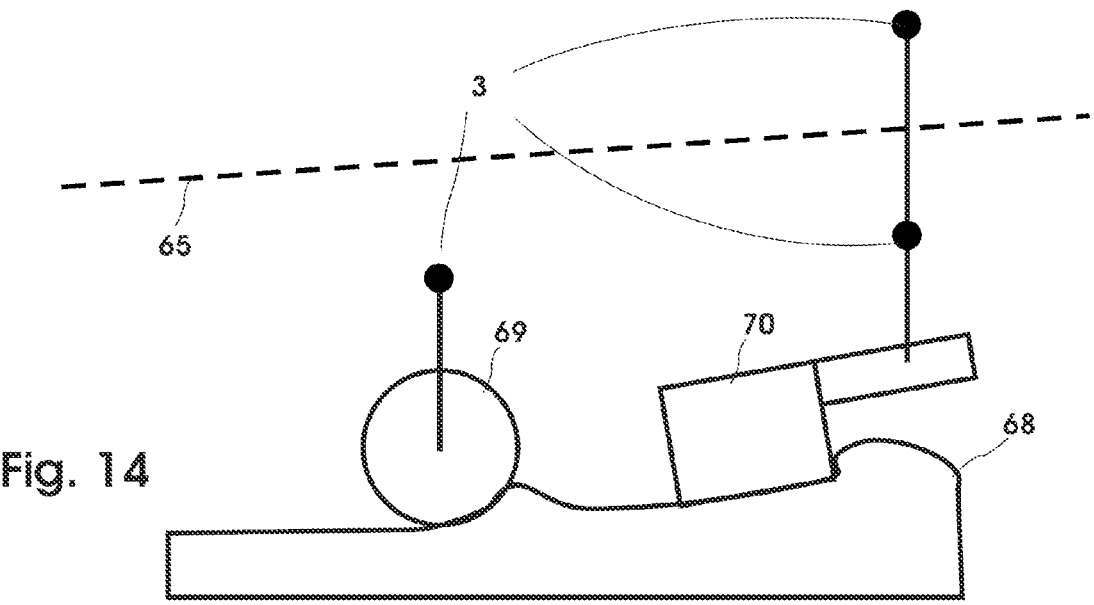
FIG. 14 shows an attachment of active targets in the case of a method for determining height and location of a vehicle, according to an example embodiment of the present invention.

In this respect, FIG. 14 shows the attachment of the active targets 3 to a rolling member 69 of a road roller, and to the kinematic center of a screed board 70 of a road paver. The screed board serves to level a hot asphalt pavement 68 with a predetermined height; said predetermined height is intended to be predefined by a virtual guide line.

In this case, owing to the high precision achieved, upon repeated passages of the road roller over the still hot pavement, the measuring system disclosed above makes it possible to determine the so-called settlement, i.e., to indicate the extent to which the road pavement is compacted by the passages. This in turn makes it possible to indicate directly to the machine operator a measure of the compaction of the road pavement. For this purpose, corresponding output possibilities are provided on the active counterpart station. Preferably, the screed board has attached to it—as illustrated by way of example—at least two active targets or an active counterpart station comprising two receiving stations, which make it possible to determine an absolute height.

Figure 15:
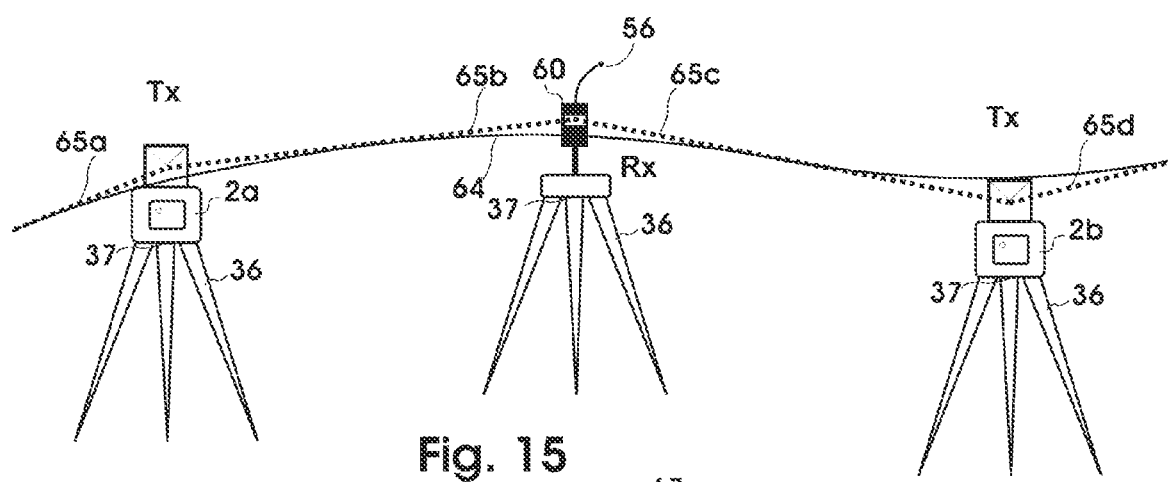
FIG. 15 shows virtual laser planes and an interpolation at the transition between the support points when implementing a method according to an example embodiment of the present invention with a virtual guide line or string line.

FIG. 15 shows how a virtual string line 64 can be spanned with two base stations 2a and 2b and with a stationary target Rx between the latter. In this case, two virtual planes 65a and 65b are determined for the base station 2a, and two virtual planes 65c and 65d are determined for the base station 2b. In this case, the virtual planes 65b and 65c contain the respective connecting line from the base station 2a and 2b, respectively, to the stationary target Rx arranged therebetween. In order that the virtual planes 65b and 65c are completely defined, a desired direction perpendicular to the connecting lines can additionally be defined. A desired transverse inclination of the virtual planes connecting the base stations and the target situated therebetween is thus defined. On the basis of the virtual planes, it is then possible for an interpolated area to be defined or a virtual guide line to be defined. With the active target 3 arranged in stationary fashion, i.e., the active counterpart station 3 arranged in stationary fashion, it is thus possible to provide a support point for the interpolated areas or guide lines which is set up significantly more simply and is thus less expensive than a base station, specifically even with the use of base stations according to the invention with a wobbling beam plane.

Figure 16:
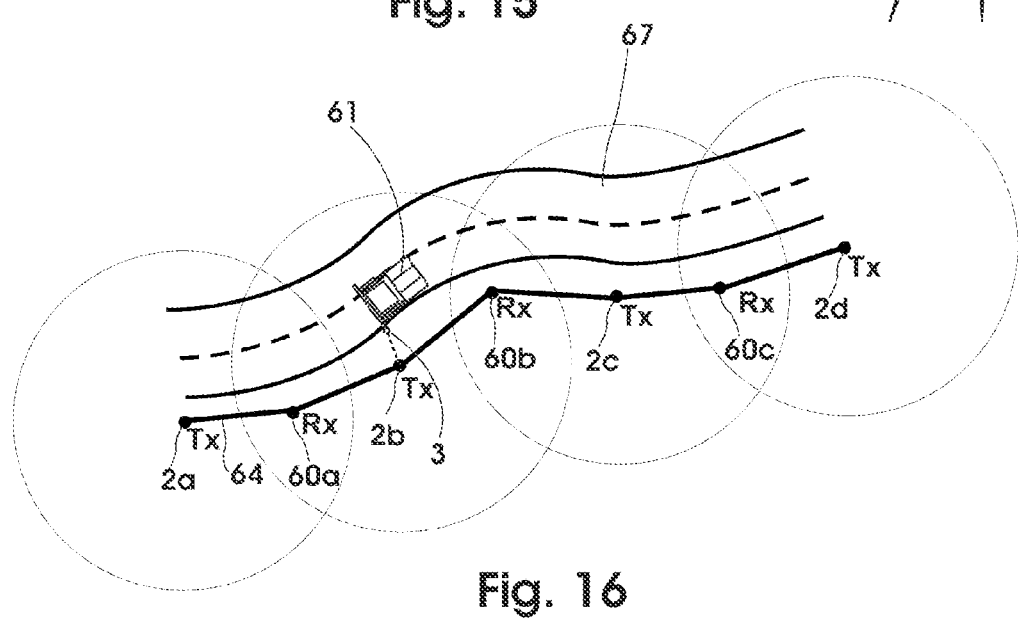
FIG. 16 shows a plan view of a course of a road and a road paver when implementing the method also elucidated by FIG. 15 with a virtual string line.

For road construction 67 with a road paver 61 and with an active target 3 attached to the screed board thereof, FIG. 16 shows in plan view that and how a virtual guide line 64 set up according to the invention using active counterpart stations Rx as support points can be used for height and location determination. It should be mentioned that if additional items of information such as points of intersection of direction angles with the planned course of the travel of the vehicle are incorporated or odometer values are computed with them, it is possible to dispense with an optional absolute position determination at least for the height monitoring, although the necessary control parameters for interpolation and smoothing of the guidance variable at the transition points of the segments are nevertheless determinable sufficiently accurately.

Although it has been explicitly described above that and how the measuring assembly of the present invention is applicable for guiding vehicles and machines, it should be emphasized that the measuring assembly also affords advantages for a number of further applications.

In this regard, inter alia, dual-slope lasers for construction site operation can be replaced by the measuring assembly. In this case, it is particularly advantageous to predefine the inclination of the virtual laser plane at the active target and to be able to set the inclination axes with the active target also as desired.

It is moreover even conceivable for different users here to work with different inclination planes. An application in the leveling of conical surfaces, such as e.g., for conical piles of material, is likewise possible, which otherwise necessitates expensive special lasers.

Mention should also be made of the possibility, in a manner similar to that in the case of multi-cross lasers, of projecting a plurality of virtual planes that are perpendicular to one another and of aligning them with the active target, without the base station having to be rotated mechanically. These properties are likewise very advantageous for industrial measurement in the case of the alignment of machines and shafts.

The measuring assembly can furthermore advantageously serve for internal location monitoring of segments in tunnel boring machines or as a core component for innovative canal construction lasers, and also for deformation measurements in monitoring applications.

A description has thus been given of, inter alia, a measuring assembly for position determination which consists of at least one object whose position or location is to be determined, at least one active target which is spatially fixedly related thereto, and at least one base station, the active target falling within the detection region thereof, and is characterized in that the base station generates a wobbling beam plane and the wobble movement is defined by the fact that the normal to the beam plane rotates about a rotational axis with a rotation angle known at any time, said rotational axis being non-parallel to said normal and being at a predefined, largely constant angle of inclination with respect to said normal, and that the beam plane impinges on the active target at least twice per rotation of the normal.

Furthermore, a corresponding measuring assembly has been disclosed wherein the at least two angular positions of the rotation of the normal to the beam plane about the rotational axis at the points in time of the two hits are used to calculate at least one direction angle in relation to the polar coordinate system of the base station.

Furthermore, a corresponding measuring assembly has been disclosed wherein the active target is designed for calculating at least one vertical angle in relation to the polar coordinate system of the base station.

Furthermore, a corresponding measuring assembly has been disclosed wherein the active target is designed for calculating at least one horizontal angle in relation to the polar coordinate system of the base station.

Furthermore, a corresponding measuring assembly has been disclosed wherein the base station contains a rotating beam deflecting component.

Furthermore, a corresponding measuring assembly has been disclosed wherein the base station contains a beam plane expanding component.

Furthermore, a corresponding measuring assembly has been disclosed wherein the base station contains an opto-electronic beam transmitting element, the radiation of which is collimated and is deflected by the rotating beam deflecting component and is expanded by the beam plane expanding component to form the wobbling beam plane.

Furthermore, a corresponding measuring assembly has been disclosed wherein a means for modulating the optoelectronic beam transmitting element with an angle-encoded data signal is provided in the base station.

Furthermore, a corresponding measuring assembly has been disclosed wherein further auxiliary data are also transmitted in addition to the angle data.

Furthermore, a corresponding measuring assembly has been disclosed wherein the transmitted auxiliary data include the position of an inclination compensator in the base station.

Furthermore, a corresponding measuring assembly has been disclosed wherein the transmitted auxiliary data include a unique identifier (ID or serial number) of the base station.

Furthermore, a corresponding measuring assembly has been disclosed wherein the active target is equipped to determine the angular position of the rotation of the normal to the beam plane about the rotational axis from the radiation of the beam plane, said radiation being modulated with the angle-encoded data signal and auxiliary data, at the point in time of the impingement and a temporal centroid calculation.

A description has also been given of a method for determining height and location of a vehicle by means of a measuring assembly for optical or quasi-optical position determination comprising at least one active target that is fixedly related to the vehicle, and at least one base station, the active target falling within the detection region of said at least one base station, wherein at least one further, stationary, active target is provided, and the connecting line between the base station and the stationary active target spans a segment of a virtual guide wire and a virtual plane with a predefined transverse inclination, at which the vehicle is guided in terms of its working height, in a manner comparable to a traditional guide wire, with the aid of the direction angles of the base station that are obtained by means of the active targets.

It is advantageous, in the case of such a method for determining the height and location of a vehicle, if a plurality of alternating segments consisting of base stations and stationary active targets form a chain of segments of a virtual guide wire.

It should be mentioned that it is furthermore advantageous if additional items of information such as points of intersection of the direction angles with the planned course of the travel of the vehicle are incorporated or odometers are computed in order to determine necessary control parameters for interpolation and smoothing of the guidance variable at the transition points of the segments.

It should be pointed out that the text above mentions at many points a base station that generates a wobbling beam plane, wherein the wobble movement is defined by the fact that the normal to the beam plane rotates about a rotational axis with a rotation angle known at any time, said rotational axis being non-parallel to said normal and being at a predefined, largely constant angle of inclination with respect to said normal, and that the beam plane impinges on the active target at least twice per rotation of the normal. Such a wobble movement generated by rotation of the normal to the beam plane is particularly advantageous because it can be generated and detected in a simple way, as evident above. It should be pointed out, however, that optionally other movements would be possible, for example by virtue of the fact that an optical element used for beam tilting, such as a conical mirror or a planoconcave axicon, does not simply rotate about an axis parallel to the axis of the incident beam, rather a more complex movement is superimposed. By way of example, a normal rotation as described above can be combined with an additional tilting brought about in an actuator-based manner. In this respect, the precession of a gyroscope should be recalled, which likewise need not be totally regular.

It should be emphasized, however, that specific information can also be transmitted in some other way, for example via radio or in a wired manner. If angle information is transmitted in this case, it is advantageous, however, if the latency is accurately known.

The invention claimed is:

1. A base station comprising:
   a controller;
   an optoelectronic emitter configured to emit measurement radiation towards the optical element;
   a motor; and
   an optical element arranged (a) to convert emitted measurement radiation into a beam plane, (b) to be rotated about a rotation axis and (c) circumferentially asymmetrically relative to the rotation axis;
   wherein;
      the controller is configured to execute a method over a measurement period, the method comprising:
         while the optoelectronic emitter emits a measurement radiation towards the optical element, controlling the motor to rotate the optical element, thereby wobbling the beam plane at an output side of the optical element, such that, over a course of the measurement period, a normal to the beam plane repeatedly transitions to cycle one or more times through a predefined set of angular positions relative to the base station in a predefined manner, each of the angular positions being a respective known predefined angular position at a respective known corresponding point in time within the measurement period, the wobbling occurring due to the circumferentially asymmetric arrangement of the optical element relative to the rotation axis;
         detecting impingements of the wobbling beam plane with a target;
         determining respective times of the detected impingements and one or more intervals between the detected impingements; and
         correlating the determined times and intervals with specific ones of the known predefined angular positions of the normal to the beam plane relative to the base station at the known corresponding points in time, thereby obtaining a measurement of the target;
      during the measurement period, the beam plane impinges upon the target at least at two phase angles ($\psi_1$ and $\psi_2$) of the cycle; and
      the base station includes at least one of the following three features (I)-(III):
         (I)(i) the measurement includes determination of a horizontal direction angle ($\psi$) of the target relative to the base station based on the two phase angles, ii) the determination of the horizontal direction angle $\psi$ is performed by averaging the two phase angles, and (iii) the rotation of the optical element causes a point on the normal to follow a predefined path around the rotation axis in each of the cycles, the at least two phase angles occurring in a same one of the cycles;
         (II)(i) the measurement includes determination of a vertical direction angle (2) of the target relative to the base station based on the two phase angles, (ii) the determination of the vertical direction angle $\lambda$ is as $2=a\,\tan(\tan(\alpha)\cdot\cos(\psi_2-\psi_1))$, where $\alpha$ represents a predefined constant angular value of the orientation of the normal to the beam plane relative to the rotation axis, and (iii) the rotation of the optical element causes the point on the normal to follow the predefined path around the rotation axis in each of the cycles, the at least two phase angles occurring in the same one of the cycles; and (III) (i) the measurement includes determination of the horizontal direction angle $\psi$ of the target relative to the base station based on the two phase angles, (ii) the determination of the horizontal direction angle $\psi$ is performed by the averaging of the two phase angles, and (iii) the measurement further includes the determination of the vertical direction angle $\lambda$ of the target relative to the base station based on the two phase angles.

2. The base station of claim 1, wherein:
the optical element includes a rotatable beam deflector;
the rotation of the optical element causes the point on the normal to follow the predefined path around the rotation axis in each of the cycles, each position on the path being at a respective predefined phase angle of the rotation;
each angular position of the predefined set of angular positions corresponds to a respective one of the phase angles;
the wobbling causes the beam plane to sweep in a manner by which the beam plane impinges upon the target at least twice per single rotation of the normal over an entirety of the predefined path.

3. The base station of claim 1, further comprising:
a collimator that is configured to collimate the measurement radiation generated by the optoelectronic emitter, wherein:
the optical element is a beam expander or the base station further comprises a beam expander separate from the optical element; and
the beam expander is configured to expand the collimated measurement radiation from the collimator to form the wobbling beam plane of emitted measurement radiation.

4. The base station of claim 3, wherein the controller is configured to modulate the measurement radiation generated by the optoelectronic emitter with a data signal.

5. The base station of claim 4, wherein:
the rotation of the optical element causes the point on the normal to follow the predefined path around the rotation axis in each of the cycles, each position on the path being at a respective predefined phase angle of the rotation;
each angular position of the predefined set of angular positions corresponds to a respective one of the phase angles; and
the data signal encodes a currently selected one of the phase angles.

6. The base station of claim 5, wherein the data signal further encodes at least one of (a) a tilting of the rotation axis determined with a tilting sensor, (b) a unique identifier of the base station, (c) a temperature of the base station, and (d) a battery status of the base station.

7. The base station of claim 1, wherein:
the target is a retroreflector target; and
the base station is configured to detect retroreflected measurement radiation from the retroreflector target for the detection of the impingements.

8. The base station of claim 1, further comprising an angle encoder disk, wherein the predefined angular positions at the corresponding points in time are known to the controller by scanning the angle encoder disk.

9. The base station of claim 8, wherein the angle encoder disk is arranged so that the angle encoder disk encircles the rotation axis.

10. The base station of claim 1, further comprising:
a tilt compensator, wherein the tilt compensator is configured to perform a compensation for a tilt of the rotation axis.

11. The base station of claim 1, wherein the measurement includes the determination of the horizontal direction angle $\psi$ of the target relative to the base station based on the two phase angles.

12. The base station of claim 11, wherein the horizontal direction angle is determined by the averaging of the two phase angles.

13. The base station of claim 12, wherein the measurement includes the determination of the vertical direction angle $\lambda$ of the target relative to the base station based on the two phase angles.

14. The base station of claim 13, wherein the vertical direction angle is determined as $\lambda=a\,\tan(\tan(\alpha)\cdot\cos(\psi_2-\psi_1))$, where a represents the predefined constant angular value of the orientation of the normal to the beam plane relative to the rotation axis.

15. The base station of claim 1, wherein the measurement includes the determination of each of the horizontal direction angle $\psi$ and the vertical direction angle $\lambda$ of the target relative to the base station based on the two phase angles, and the determination is made based on depending upon a time interval between the impingements of the beam plane upon the target at the two phase angles.

16. The base station of claim 1, wherein the measurement of the target includes (a) a rotational angle of the target relative to the base station with respect to a horizontal direction and (b) and azimuth angle of the target relative to the base station.

17. A method for performance during a measurement period, wherein a base station includes a controller, an optoelectronic emitter configured to emit measurement radiation towards the optical element, a motor, and an optical element arranged (a) to convert emitted measurement radiation into a beam plane, (b) to be rotated about a rotation axis, and (c) circumferentially asymmetrically relative to the rotation axis, the method comprising the following during the measurement period:
while the optoelectronic emitter emits a measurement radiation towards the optical element, controlling the motor to rotate the optical element, thereby wobbling the beam plane at an output side of the optical element, such that, over a course of the measurement period, a normal to the beam plane repeatedly transitions to cycle one or more time through a predefined set of angular positions relative to the base station in a predefined manner, each of the angular positions being a respective known predefined angular position at a respective known corresponding point in time within the measurement period, the wobbling occurring due to the circumferentially asymmetric arrangement of the optical element relative to the rotation axis;
detecting impingements of the wobbling beam plane with a target;

determining respective times of the detected impingements and one or more intervals between the detected impingements; and correlating the determined times and intervals with specific ones of the known predefined angular positions of the normal to the beam plane relative to the base station at the known corresponding points in time, thereby obtaining a measurement of the target;

wherein:

during the measurement period, the beam plane impinges upon the target at least at two phase angles ($\psi_1$ and $\psi_2$) of the cycle; and the method includes at least one of the following three features (I)-(III):

(I)(i) the measurement includes determination of a horizontal direction angle (ψ) of the target relative to the base station based on the two phase angles, (ii) the determination of the horizontal direction angle ψ is performed by averaging the two phase angles, and (iii) the rotation of the optical element causes a point on the normal to follow a predefined path around the rotation axis in each of the cycles, the at least two phase angles occurring in a same one of the cycles;

(II)(i) the measurement includes determination of a vertical direction angle (λ) of the target relative to the base station based on the two phase angles, (ii) the determination of the vertical direction angle λ is as $\lambda = a\tan(\tan(\alpha) \cdot \cos(\psi_2 - \psi_1))$, where α represents a predefined constant angular value of the orientation of the normal to the beam plane relative to the rotation axis, and (iii) the rotation of the optical element causes the point on the normal to follow the predefined path around the rotation axis in each of the cycles, the at least two phase angles occurring in the same one of the cycles; and (III)(i) the measurement includes determination of the horizontal direction angle ψ of the target relative to the base station based on the two phase angles, (ii) the determination of the horizontal direction angle ψ is performed by the averaging of the two phase angles, and (iii) the measurement further includes the determination of the vertical direction angle λ of the target relative to the base station based on the two phase angles.

18. The method of claim 17, wherein the measurement includes at least one angle in relation to a polar coordinate system of the base station.

19. The method of claim 18, wherein at least two angular positions of the beam plane normal rotating as a result of the wobbling at the respective points in time of the impingements are determined, and the measurement is based on the determined at least two angular positions.

20. The method of claim 19, wherein:

the determination of the angular positions is performed by decoding the radiation modulated with an angle-encoding data signal; and/or the method includes calculating at least one vertical angle relative to the polar coordinate system of the base station and/or at least one horizontal angle relative to the polar coordinate system of the base station.

21. The method of claim 17, further comprising, during the measurement period:

receiving beams of the beam plane generated by the base station; and receiving, from the base station, information indicating the angular positions of the normal in association with the corresponding points in time, wherein the measurement is obtained based on the received beams and the received information.

22. The method of claim 21, wherein the receiving of the beams is via at least two light-sensitive elements that are spaced apart from one another and that are arranged at different heights during operation, and the method further comprises:

resolving an ambiguity of measurements based on a time signature of a sweeping of the emitted beams over the at least two light-sensitive elements.

23. A system comprising:

a base station that includes:
a controller;
an optoelectronic emitter configured to emit measurement radiation towards the optical element;
a motor; and
an optical element arranged (a) to convert emitted measurement radiation into a beam plane, (b) to be rotated about a rotation axis and (c) circumferentially asymmetrically relative to the rotation axis;

wherein:

the system is configured to execute a method over a measurement period, the method comprising:

while the optoelectronic emitter emits a measurement radiation towards the optical element, controlling, by the controller, the motor to rotate the optical element, thereby wobbling the beam plane at an output side of the optical element, such that, over a course of the measurement period, a normal to the beam plane repeatedly transitions to cycle one or more time through a predefined set of angular positions relative to the base station in a predefined manner, each of the angular positions being a respective known predefined angular position at a respective known corresponding point in time within the measurement period, the wobbling occurring due to the circumferentially asymmetric arrangement of the optical element relative to the rotation axis;

detecting impingements of the wobbling beam plane with a target;

determining respective times of the detected impingements and one or more intervals between the detected impingements; and correlating the determined times and intervals with specific ones of the known predefined angular positions of the normal to the beam plane relative to the base station at the known corresponding points in time, thereby obtaining a measurement of the target;

during the measurement period, the beam plane impinges upon the target at least at two phase angles ($\psi_1$ and $\psi_2$) of the cycle; and the method includes at least one of the following three features (I)-(III):

(I)(i) the measurement includes determination of a horizontal direction angle (ψ) of the target relative to the base station based on the two phase angles, (ii) the determination of the horizontal direction angle ψ is performed by averaging the two phase angles, and (iii) the rotation of the optical element causes a point on the normal to follow a predefined path around the rotation axis in each of the cycles, the at least two phase angles occurring in a same one of the cycles;

(II)(i) the measurement includes determination of a vertical direction angle (λ) of the target relative to the base station based on the two phase angles, (ii) the determination of the vertical direction angle $\lambda$ is as $2=a\ \tan(\tan(\alpha)\text{-}\cos(\psi_2\text{-}\psi_1))$, where $\alpha$ represents a predefined constant angular value of the orientation of the normal to the beam plane relative to the rotation axis, and (iii) the rotation of the optical element causes the point on the normal to follow the predefined path around the rotation axis in each of the cycles, the at least two phase angles occurring in the same one of the cycles; and (III)(i) the measurement includes determination of the horizontal direction angle $\psi$ of the target relative to the base station based on the two phase angles, (ii) the determination of the horizontal direction angle $\psi$ is performed by the averaging of the two phase angles, and (iii) the measurement further includes the determination of the vertical direction angle $\lambda$ of the target relative to the base station based on the two phase angles.

24. The system of claim 23, further comprising a beam receiver, wherein the beam receiver is configured to:
  receive beams of the beam plane generated by the base station; and
  receive, from the base station, information indicating the angular positions of the normal in association with the corresponding points in time, wherein the measurement is obtained based on the received beams and the received information.

25. The system of claim 24, wherein the measurement includes at least one angle in relation to a polar coordinate system of the base station.

26. The system of claim 25, wherein at least two angular positions of the beam plane normal rotating as a result of the wobbling at the respective points in time of the impingements are determined, and the measurement is based on the determined at least two angular positions.

* * * * *